United States Patent
Tadesse et al.

(10) Patent No.: US 12,411,697 B2
(45) Date of Patent: Sep. 9, 2025

(54) PLUGIN MANAGEMENT SYSTEM FOR AN INTERACTIVE SYSTEM OR PLATFORM

(71) Applicant: Figma, Inc., San Francisco, CA (US)

(72) Inventors: Bersabel Tadesse, San Francisco, CA (US); Jonas Sicking, San Francisco, CA (US); Yi Tang Jackie Chui, San Francisco, CA (US); John Doherty, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 0 days.

(21) Appl. No.: 17/888,382

(22) Filed: Aug. 15, 2022

(65) Prior Publication Data

US 2023/0082639 A1 Mar. 16, 2023

Related U.S. Application Data

(60) Provisional application No. 63/233,635, filed on Aug. 16, 2021.

(51) Int. Cl.
*G06F 9/445* (2018.01)

(52) U.S. Cl.
CPC .............................. *G06F 9/44526* (2013.01)

(58) Field of Classification Search
None
See application file for complete search history.

(56) References Cited

U.S. PATENT DOCUMENTS

| | | | |
|---|---|---|---|
| 5,339,389 A | 8/1994 | Bates | |
| 7,770,122 B1 | 8/2010 | Shaik | |
| 8,667,480 B1 * | 3/2014 | Sigurdsson | G06F 8/65 717/170 |
| 9,229,702 B1 * | 1/2016 | Kapulkin | G06F 8/65 |
| 9,424,545 B1 | 8/2016 | Lee | |
| 9,430,229 B1 | 8/2016 | Zijst | |
| 10,606,576 B1 | 3/2020 | Tung | |
| 10,620,921 B2 | 4/2020 | Brebner | |
| 11,138,518 B1 | 10/2021 | Yu | |
| 2008/0040426 A1 | 2/2008 | Synstelien | |
| 2010/0192107 A1 | 7/2010 | Takahashi | |
| 2010/0238494 A1 * | 9/2010 | Araki | G06F 3/1204 358/1.15 |
| 2010/0306181 A1 | 12/2010 | Little | |
| 2011/0113350 A1 | 5/2011 | Carlos | |
| 2011/0268262 A1 | 11/2011 | Jones | |

(Continued)

OTHER PUBLICATIONS

International Search Report and The Written Opinion of The International Searching Authority mailed Nov. 28, 2022, for related PCT/US2022/040461 filed Aug. 16, 2022, 14 pages.

(Continued)

*Primary Examiner* — Umut Onat

(74) *Attorney, Agent, or Firm* — Squire Patton Boggs LLP; Sarah Mirza

(57) ABSTRACT

A plugin management system is provided as part of an interactive system, to enable users to search for and execute desired plugins. The plugin management system provides a search user interface to receive inputs from the user, as well as parametric values that are used by the selected plugin. Based on the user interaction with the search user interface, the plugin management system executes identified plugins, using parametric values specified by the user.

20 Claims, 16 Drawing Sheets

(56) References Cited

U.S. PATENT DOCUMENTS

| | | | |
|---|---|---|---|
| 2012/0159145 A1* | 6/2012 | Cheong | G06F 8/61 |
| | | | 713/100 |
| 2012/0247967 A1 | 10/2012 | James | |
| 2013/0111338 A1 | 5/2013 | Huo | |
| 2014/0310660 A1 | 10/2014 | Rosen | |
| 2015/0127753 A1 | 5/2015 | Tew | |
| 2016/0321449 A1 | 11/2016 | Surti | |
| 2017/0192656 A1 | 7/2017 | Pedrick | |
| 2017/0262294 A1 | 9/2017 | Yakan | |
| 2017/0339370 A1 | 11/2017 | Inoue | |
| 2018/0088915 A1* | 3/2018 | Yang | G06F 40/186 |
| 2018/0181299 A1 | 6/2018 | Ouellette et al. | |
| 2019/0065440 A1* | 2/2019 | Lu | G06F 9/44526 |
| 2019/0146811 A1 | 5/2019 | Pell | |
| 2019/0179501 A1 | 6/2019 | Seeley | |
| 2019/0238602 A1 | 8/2019 | Lo | |
| 2019/0303880 A1 | 10/2019 | Hashimoto | |
| 2019/0361580 A1 | 11/2019 | Dowling et al. | |
| 2020/0042648 A1* | 2/2020 | Rao | G06F 16/2457 |
| 2020/0050431 A1* | 2/2020 | Zilouchian Moghaddam | |
| | | | G06F 8/38 |
| 2020/0296147 A1 | 9/2020 | Eliason | |
| 2021/0208775 A1 | 7/2021 | Allington | |
| 2021/0367986 A1 | 11/2021 | Davuluri et al. | |
| 2022/0108276 A1 | 4/2022 | Stringham | |
| 2022/0129118 A1 | 4/2022 | Hsu | |
| 2022/0263675 A1 | 8/2022 | Cupala | |
| 2022/0334704 A1 | 10/2022 | Lin | |
| 2022/0334806 A1 | 10/2022 | Lin | |
| 2022/0342644 A1 | 10/2022 | Fuetsch | |

OTHER PUBLICATIONS

International Search Report and The Written Opinion of The International Searching Authority mailed Dec. 12, 2022, for related PCT/US2022/041418 filed Aug. 24, 2022, 11 pages.
"Zack Qattan, "Collaborative Cursor Chat w/Croquet", Nov. 30, 2020, youtube.com, https://www.youtube.com/watch?v=NiqTCROdlgw, pp. 1-15 (Year: 2020)".
Anonymous: "Change cursor into custom text", Dec. 24, 2018 (Dec. 24, 2018), XP055930588, Retrieved from the Internet: URL: https://stackoverflow.com/questions/53916492/change-cursor-into-custome-text [retrieved on Jun. 13, 2022] the whole document, 2 pages.
International Search Report and The Written Opinion of The International Searching Authority mailed Jul. 1, 2022, for related PCT/US2022/025626, filed Apr. 20, 2022, 17 pages.
Wallace Evan: "Multiplayer Editing in Figma", figma.com/blog, Sep. 28, 2016 (Sep. 28, 2016), XP055930547, Retrieved from the Internet: URL: https://www.figma.com/blog/multiplayer-editing-in-figma/ [retrieved on Jun. 13, 2022] the whole document, 7 pages.
Anonymous: "HTML editor—Wikipedia". Apr. 13, 2022 pp. 1-4.
International Search Report and Written Opinion mailed Jun. 27, 2023 in PCT/US2023/015322.
International Search Report dated Aug. 18, 2023 in PCT/US2023/020890.
IPRP dated Jul. 3, 2024 in PCT/US2023/020890.
Written Opinion dated Apr. 10, 2024 in PCT/US2023/020890.

* cited by examiner

PLUGIN MANAGEMENT SYSTEM FOR AN INTERACTIVE SYSTEM OR PLATFORM

RELATED APPLICATION(S)

This application claims benefit of priority to Provisional U.S. Patent Application No. 63/233,635, filed Aug. 16, 2021; the aforementioned priority application being hereby incorporated by reference in its entirety.

TECHNICAL FIELD

Examples described herein relate to graphic design systems, and more specifically, to plugin management for integrated graphic design systems.

BACKGROUND

Software design tools have many forms and applications. In the realm of application user interfaces, for example, software design tools require designers to blend functional aspects of a program with aesthetics and even legal requirements, resulting in a collection of pages which form the user interface of an application. For a given application, designers often have many objectives and requirements that are difficult to track.

DETAILED DESCRIPTION

Figure 1A:
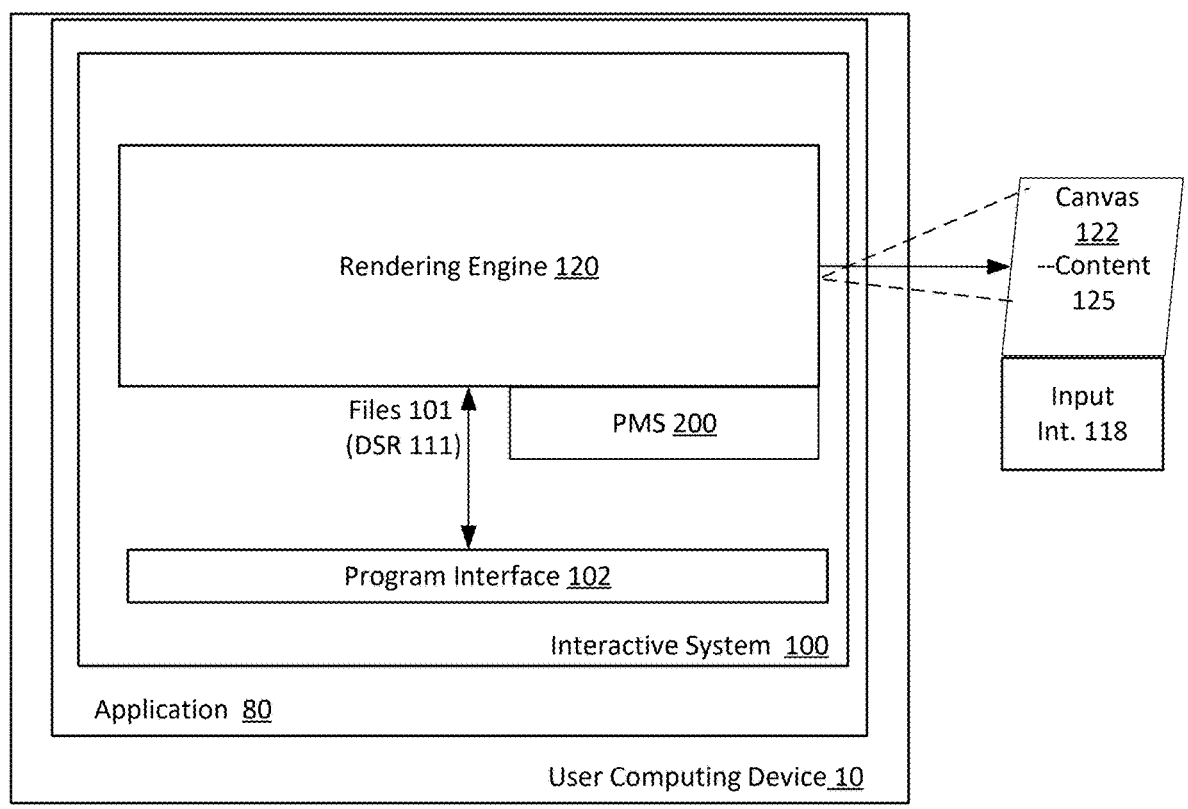
FIG. 1A illustrates an interactive system for a computing device of a user, according to one or more embodiments.

Embodiments provide for an interactive system or platform that includes a plugin management system, to enable users to search for and execute desired plugins. In examples, the plugin management system provides a search user interface to receive inputs from the user, as well as parametric values that are used by the selected plugin. Based on the user interaction with the search user interface, the plugin management system executes identified plugins, using parametric values specified by the user.

In examples, a computing system is configured to implement an interactive system or platform for enabling users to create various types of content, including graphic designs, whiteboards, presentations, web pages and other types of content. Among other advantages, examples as described enable such users to utilize plugins to extend or supplement the functionality of an integrated graphic design system for their particular needs.

Still further, in some examples, a network computer system is provided to include memory resources store a set of instructions, and one or more processors are operable to communicate the set of instructions to a plurality of user devices. The set of instructions can be communicated to user computing devices, in connection with the user computing devices being operated to render a content on a canvas, where the design can be edited by user input that is indicative of any one of multiple different input actions. The set of instructions can be executed on the computing devices to cause each of the computing devices to determine one or more input actions to perform based on user input. The instructions may further cause the user computing devices to implement the one or more input actions to modify the content. In such examples, the interactive system includes a plugin management system to enable users to search for and execute plugins that extend or supplement the functionality provided by the plugin management system.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1A illustrates an interactive system for a computing device of a user, according to one or more examples. An interactive system 100 can be implemented in any one of multiple different computing environments. For example, in some variations, the system 100 can be implemented as a client-side application that executes on the user computing device 10 to provide functionality as described with various examples. In other examples, such as described below, the system 100 can be implemented through use of a web-based application 80. As an addition or alternative, the system 100 can be implemented as a distributed computing environment, such that processes described with various examples execute on a network computer (e.g., server) and/or on the user device 10.

According to examples, interactive system 100 is implemented on a user computing device 10 to enable a corresponding user to generate content such as interactive designs and whiteboards. The system 100 can include processes that execute as or through a web-based application 80 that is installed on the computing device 10. As described by various examples, web-based application 80 can execute scripts, code and/or other logic (the "programmatic components") to implement functionality of the interactive system 100. Additionally, in some variations, the system 100 can be implemented as part of a network service, where web-based application 80 communicates with one or more remote computers (e.g., server used for a network service) to executes processes of the system 100.

In some examples, web-based application 80 retrieves some or all of the programmatic resources for implementing the system 100 from a network site. As an addition or alternative, web-based application 80 can retrieve some or all of the programmatic resources from a local source (e.g., local memory residing with the computing device 10). The web-based application 80 may also access various types of data sets in providing functionality or services for the interactive system 100. The data sets can correspond to files and libraries, which can be stored remotely (e.g., on a server, in association with an account), locally or distributed between local and network resources.

In examples, the web-based application 80 can correspond to a commercially available browser, such as GOOGLE CHROME (developed by GOOGLE, INC.), SAFARI (developed by APPLE, INC.), and INTERNET EXPLORER (developed by the MICROSOFT CORPORATION). In such examples, the processes of the interactive system 100 can be implemented as scripts and/or other embedded code which web-based application 80 downloads from a network site. For example, the web-based application 80 can execute code that is embedded within a webpage to implement processes of the system 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., webpage structured in accordance with HTML 5.0 or other versions, as provided under standards published by W3C or WHATWG consortiums). In some examples, the rendering engine 120 and/or other components may utilize graphics processing unit (GPU) accelerated logic, such as provided through WebGL (Web Graphics Library) programs which execute Graphics Library Shader Language (GLSL) programs that execute on GPUs.

According to examples, the user of computing device 10 operates web-based application 80 to access a network site, where programmatic resources are retrieved and executed to implement the interactive system 100. In some examples, the user may initiate a session to implement the interactive system 100 for purpose of creating and/or editing a graphic design, whiteboard, presentation, a webpage or other type of content. In examples, the system 100 includes a program interface 102, an input interface 118, and a rendering engine 120. The program interface 102 can include one or more processes which execute to access and retrieve programmatic resources from local and/or remote sources.

In an implementation, the program interface 102 can generate, for example, a canvas 122, using programmatic resources which are associated with web-based application 80 (e.g., HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with canvas 122. The application framework can include data sets which define or configure, for example, a set of interactive tools that integrate with the canvas 122 and which comprise the input interface 118, to enable the user to provide input for creating and/or editing a given content (e.g., a graphic design, a whiteboard, a presentation, a webpage, etc.).

According to some examples, the input interface 118 can be implemented as a functional layer that is integrated with the canvas 122 to detect and interpret user input. The input interface 118 can, for example, use a reference of the canvas 122 to identify a screen location of a user input (e.g., 'click'). Additionally, the input interface 118 can interpret an input action of the user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the user can specify (e.g., right-click, screen-tap, etc.) through one or more input devices. In this manner, the input interface 118 can interpret, for example, a series of inputs as a design tool selection (e.g., shape selection based on location of input), as well as inputs to define attributes (e.g., dimensions) of a selected shape.

Additionally, the program interface 102 can be used to retrieve, from local or remote sources, programmatic resources and data sets which include files 101 which comprise an active workspace for the user. The retrieved data sets can include, for example, one or more pages that include content elements which collectively form a given content. By way of example, the content can correspond to a design interface, whiteboard, webpage, or other content medium. Each file 101 can include one or multiple data structure representations 111 which collectively define the design interface. The files 101 may also include additional data sets which are associated with the active workspace. For example, as described with some examples, the individual pages of the active workspace may be associated with a set of constraints 145. As an additional example, the program interface 102 can retrieve (e.g., from network service 152 (see FIG. 1B), from local memory, etc.) one or more types of profile information 109, such as user profile information which can identify past activities of the user of the computing device 10 when utilizing the interactive system 100. The profile information 109 can identify, for example, input types (or actions) of the user with respect to the page(s) of the active workspace, or more generally, input actions of the user in a prior time interval. In some variations, the profile information 109 can also identify historical or contextual information about individual design interfaces, as represented by corresponding data structure representations 111.

In examples, the rendering engine 120 uses the data structure representations 111 to render a corresponding content 125 on the canvas 122, wherein the content 125 reflects elements or components and their respective attributes, as may be provided with the individual pages of the files 101. The user can edit the content 125 using the input interface 118. Alternatively, the rendering engine 120 can generate a blank page for the canvas 122, and the user can use the input interface 118 to generate the content 125. By way of example, the content 125 can include graphic elements such as a background and/or a set of objects (e.g., shapes, text, images, programmatic elements), as well as attributes of the individual graphic elements. Each attribute of a graphic element can include an attribute type and an attribute value. For an object, the types of attributes include, shape, dimension (or size), layer, type, color, line thickness, text size, text color, font, and/or other visual characteristics. Depending on implementation, the attributes reflect properties of two- or three-dimensional designs. In this way, attribute values of individual objects can define, for example, visual characteristics of size, color, positioning, layering, and content, for elements that are rendered as part of the content 125.

In examples, individual design elements may also be defined in accordance with a desired run-time behavior. By way of example, some objects can be defined to have run-time behaviors that are either static or dynamic. The attributes of dynamic objects may change in response to predefined run-time events generated by the underlying application that is to incorporate the content 125. Additionally, some objects may be associated with logic that defines the object as being a trigger for rendering or changing other objects, such as through implementation of a sequence or workflow. Still further, other objects may be associated with logic that provides the design elements to be conditional as to when they are rendered and/or their respective configuration or appearance when rendered. Still further, objects may also be defined to be interactive, where one or more attributes of the object may change based on user-input during the run-time of the application.

As described with examples, the interactive system 100 enables the user of plugins by users. A plugin can be selected and executed to perform a specific set of operations, and execution of the plugin can alter the content 125 on the canvas 122. For example, a plugin library can be stored on the user computing device 10 and/or stored on a network site which the interactive system 100. Further, in examples, plugins can be used to perform a task that is difficult or time-consuming. For example, in implementations where the system 100 enables creation of interactive graphic designs, plugins can be executed to create specific types of content graphic content elements (e.g., generate iconic representation of person, create interactive table, etc.). Still further, a plugin can be configured to perform a task of altering attributes of content elements. For example, a plugin can execute to implement a task that automatically replaces the occurrence of an attribute (e.g., fill color, line color, etc.) with another attribute. Still further, plugins can implement other types of tasks, such as exporting content elements or creating data sets (e.g., programmatic code) for specified content elements. Such examples illustrate the various ways plugins can be incorporated and used with an interactive system 100, such as described by various examples.

Network Computing System

Figure 1B:
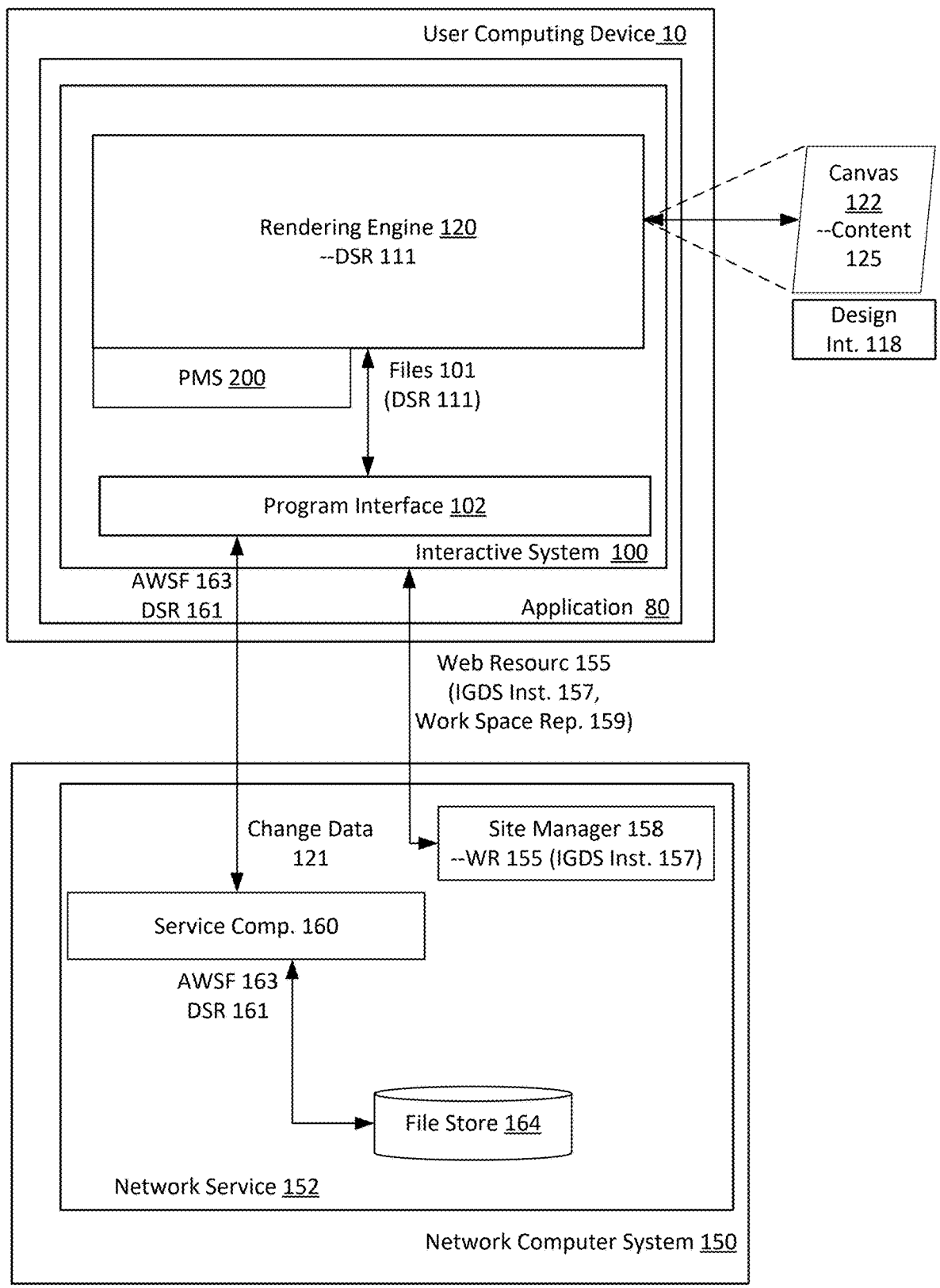
FIG. 1B illustrates a network computing system to implement an interactive system on a user computing device, according to one or more embodiments.

FIG. 1B illustrates a network computing system to implement an interactive system on a user computing device, according to one or more examples. A network computing system such as described with an example of FIG. 1B can be implemented using, for example, one or more servers which communicate with user computing devices over one or more networks.

In an example of FIG. 1B, the network computing system 150 perform operations to enable the interactive system 100 to be implemented on the user computing device 10. In variations, the network computing system 150 provides a network service 152 to support the use of the interactive system 100 by user computing devices that utilize browsers or other web-based applications. The network computing system 150 can include a site manager 158 to manage a website where a set of web-resources 155 (e.g., web page) are made available for site visitors. The web-resources 155 can include instructions, such as scripts or other logic ("system instructions 157"), which are executable by browsers or web components of user computing devices.

In some variations, once the computing device 10 accesses and downloads the web-resources 155, web-based application 80 executes system instructions 157 to implement functionality such as described with some examples of FIG. 1A. For example, the system instructions 157 can be executed by web-based application 80 to initiate the program interface 102 on the user computing device 10. The initiation of the program interface 102 may coincide with the establishment of, for example, a web-socket connection between the program interface 102 and a service component 160 of the network computing system 150.

In some examples, the web-resources 155 includes logic which web-based application 80 executes to initiate one or more processes of the program interface 102, causing the interactive system 100 to retrieve additional programmatic resources and data sets for implementing functionality as described by examples. The web resources 155 can, for example, embed logic (e.g., JAVASCRIPT code), including GPU accelerated logic, in an HTML page for download by computing devices of users. The program interface 102 can be triggered to retrieve additional programmatic resources and data sets from, for example, the network service 152, and/or from local resources of the computing device 10, in order to implement the interactive system 100. For example, some of the components of the interactive system 100 can be implemented through web-pages that can be downloaded onto the computing device 10 after authentication is performed, and/or once the user performs additional actions (e.g., download one or more pages of the workspace associated with the account identifier). Accordingly, in examples as described, the network computing system 150 can communicate the system instructions 157 to the computing device 10 through a combination of network communications, including through downloading activity of web-based application 80, where the system instructions 157 are received and executed by web-based application 80.

The computing device 10 can use web-based application 80 to access a website of the network service 152 to download the webpage or web resource. Upon accessing the website, web-based application 80 can automatically (e.g., through saved credentials) or through manual input, communicate an account identifier to the service component 160. In some examples, web-based application 80 can also communicate one or more additional identifiers that correlate to a user identifier.

Additionally, in some examples, the service component 160 can use the user or account identifier of the user identifier to retrieve profile information 109 from a user profile store 166. As an addition or variation, profile information 109 for the user can be determined and stored locally on the user's computing device 10.

The service component 160 can also retrieve the files of an active workspace ("active workspace files 163") that are linked to the user account or identifier from a file store 164. The profile store 166 can also identify the workspace that is identified with the account and/or user, and the file store 164 can store the data sets that comprise the workspace. The data sets stored with the file store 164 can include, for example, the pages of a workspace, data sets that identify constraints for an active set of workspace files, and one or more data structure representations 161 for the design under edit which is renderable from the respective active workspace files.

Additionally, in examples, the service component 160 provides a representation 159 of the workspace associated with the user to the web-based application 80, where the representation identifies, for examples, individual files associated with the user and/or user account. The workspace representation 159 can also identify a set of files, where each file includes one or multiple pages, and each page including objects that are part of a design interface.

On the user device 10, the user can view the workspace representation through web-based application 80, and the user can elect to open a file of the workspace through web-based application 80. In examples, upon the user electing to open one of the active workspace files 163, web-based application 80 initiates the canvas 122. For example, the interactive system 100 can initiate an HTML 5.0 canvas as a component of web-based application 80, and the rendering engine 120 can access one or more data structures representations 111 to render or update the corresponding content 125 on the canvas 122.

With further reference to FIG. 1B, the network computing system 150 enables the user computing device 10 to implement a plugin management system 200. For example, the network computing system 150 can provide the computing device 10 with logic to cause the computing device 10 to implement the plugin management system 200. Further, in some examples, the network computing system 150 can store a library or collection of plugins that are made available to individual users through a search user interface, such as described with other examples. In this way, the user of computing device 10 can search for and execute desired plugins to extend or supplement the functionality of the interactive system 100.

Collaborative Network Platform

Figure 1C:
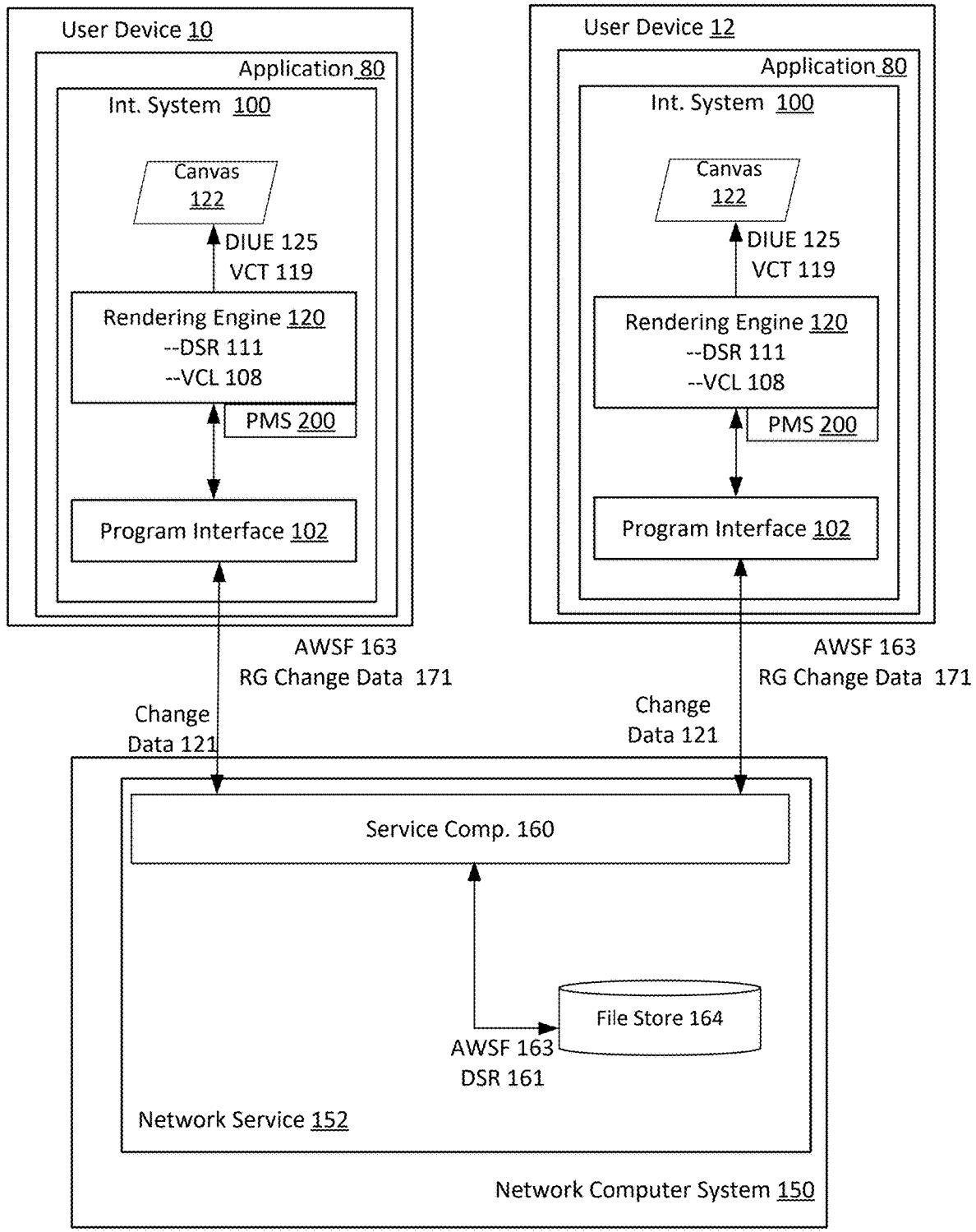
FIG. 1C illustrates a network computing system to implement an interactive system for multiple users in a collaborative network platform, according to one or more embodiments.

FIG. 1C illustrates a network computing system to implement an interactive system for multiple users in a collaborative network platform, according to one or more examples. In an example of FIG. 1C, a collaborative network platform is implemented by the network computing system 150, which communicates with multiple user computing devices 10, 12 over one or more networks (e.g., World Wide Web) to implement the interactive system 100 on user computing devices 10, 12. While FIG. 1C illustrates an example in which two users utilize the collaborative network platform, examples as described allow for the network computing system 150 to enable collaboration on design interfaces amongst a larger group of users.

With respect to FIG. 1C, the user computing devices 10, 12 can be assumed as being operated by users that are associated with a common account, with each user computing device 10, 12 implementing an instance of the interactive system 100 to access the same workspace during respective sessions that overlap with one another. Accordingly, each of the user computing devices 10, 12 may access the same set of active workspace files 163 at the same time, with the respective program interface 102 of the interactive system 100 on each user computing device 10, 12 operating to establish a corresponding communication channel (e.g., web socket connection) with the service component 160.

In examples, the service component 160 can communicate a copy of the active workspace files 163 to each user computing device 10, 12, such that the computing devices 10, 12 render the content 125 of the active workspace files 163 at the same time. Additionally, each of the computing devices 10, 12 can maintain a local data structure representation 111 of the respective content 125, as determined from the active workspace files 163. The service component 160 can also maintain a network-side data structure representation 161 obtained from the files of the active workspace 163, and coinciding with the local data structure representations 111 on each of the computing devices 10, 12.

The network computing system 150 can continuously synchronize the active workspace files 163 on each of the user computing devices. In particular, changes made by each user to the content 125 on their respective computing device 10, 12 can be immediately reflected on the content 125 rendered on the other user computing device 10, 12. By way of example, the user of computing device 10 can make a change to the respective content 125, and the respective rendering engine 120 can implement an update that is reflected in the local copy of the data structure representation 111. From the computing device 10, the program interface 102 of the interactive system 100 can stream change data 121, reflecting the change of the user input, to the service component 160. The service component 160 processes the change data 121 of the user computing device. The service component 160 can use the change data 121 to make a corresponding change to the network-side data structure representation 161. The service component 160 can also stream remotely-generated change data 171 (which in the example provided, corresponds or reflects change data 121 received from the user device 10) to the computing device 12, to cause the corresponding instance of the interactive system 100 to update the content 125 as rendered on that device. The computing device 12 may also use the remotely generated change data 171 to update with the local data structure representation 111 of that computing device 12. The program interface 102 of the computing device 12 can receive the update from the network computing system 150, and the rendering engine 120 can update the content 125 and the respective local copy of 111 of the computing device 12.

The reverse process can also be implemented to update the data structure representations 161 of the network computing system 150 using change data 121 communicated from the second computing device 12 (e.g., corresponding to the user of the second computing device updating the content 125 as rendered on the second computing device 12). In turn, the network computing system 150 can stream remotely generated change data 171 (which in the example provided, corresponds or reflects change data 121 received from the user device 12) to update the local data structure representation 111 of the content 125 on the first computing device 10. In this way, the content 125 of the first computing device 10 can be updated as a response to the user of the second computing device 12 providing user input to change the content 125.

To facilitate the synchronization of the data structure representations 111, 111 on the computing devices 10, 12, the network computing system 150 may implement a stream connector to merge the data streams which are exchanged between the first computing device 10 and the network computing system 150, and between the second computing device 12 and the network computing system 150. In some implementations, the stream connector can be implemented to enable each computing device 10, 12 to make changes to the network-side data representation 161, without added data replication that may otherwise be required to process the streams from each device separately.

Additionally, over time, one or both of the computing devices 10, 12 may become out-of-sync with the server-side data representation 161. In such cases, the respective computing device 10, 12 can redownload the active workspace files 163, to restart its maintenance of the data structure representation of the content 125 that is rendered and edited on that device.

With further reference to FIG. 1C, the network computing system 150 enables each computing device 10, 12 to implement a plugin management system 200. For example, the network computing system 150 can communicate instructions to cause each computing device 10, 12 to implement the plugin management system 200 as part of the interactive system 100. Further, in some examples, the network computing system 150 can store a library or collection of plugins that are made available to users of computing devices 10, 12 through a search user interface, such as described with other examples. In this way, the user can search for and execute desired plugins to extend or supplement the functionality of the interactive system 100.

Plugin Management System

Figure 2:
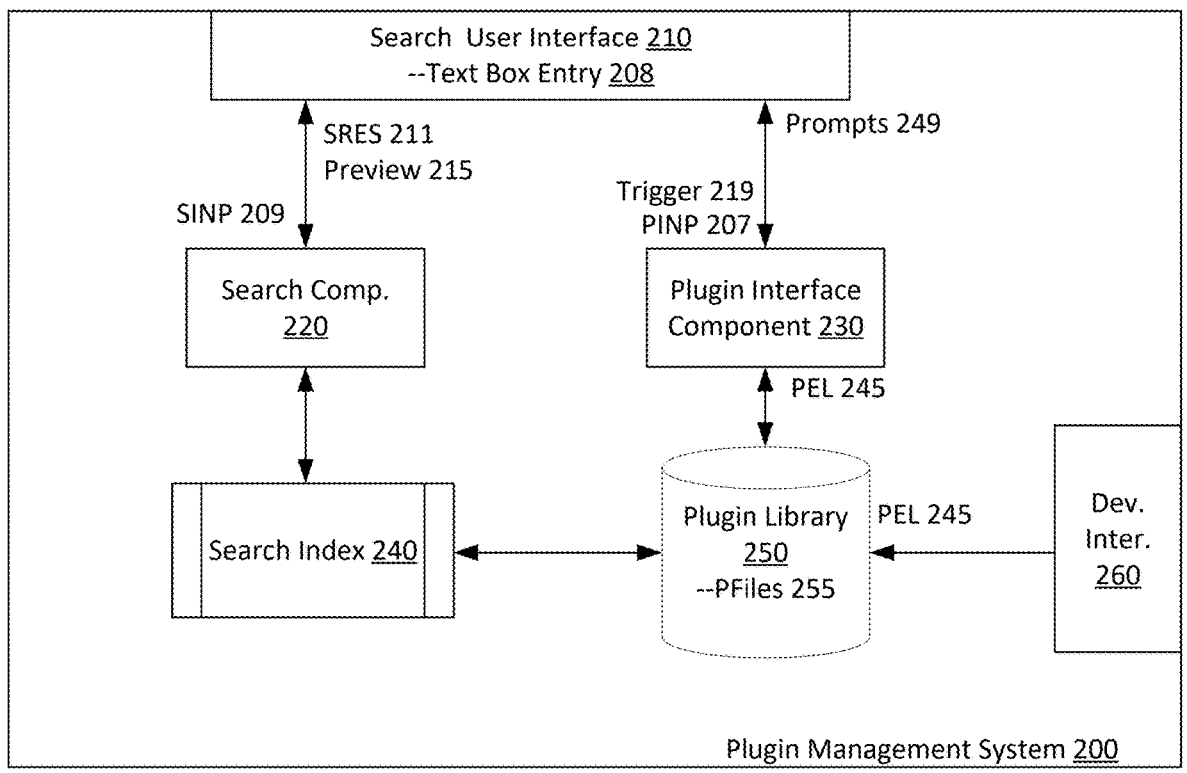
FIG. 2 illustrates a plugin management system for use with an interactive system, according to one or more embodiments.

FIG. 2 illustrates a plugin management system for use with examples as described with FIG. 1A through FIG. 1C. In some examples, a plugin management system 200 can be provided as part of the interactive system 100. In variations, the plugin management system 200 can be provided by, for example, the network computing system 150, in connection with users utilizing interactive system 100 on their respective computing devices 10, 12. As described with various examples, the plugin management system 200 enables a search and execution process for plugins, in connection with users creating and editing designs using the interactive system 100. Through the search and execution process, the user can execute a desired plugin in an intended manner, with the plugin's execution affecting a design, canvas or other aspect of the interactive system 100.

According to examples, the system 200 implements the search and execution process to seamlessly transition the user from providing search input (search terms for searching/identifying a desired plugin) to providing plugin input (input for identifying desired parametric values to successfully execute the identified plugin). For example, the system 200 can enable the user to provide a successive series of inputs through a user interface of the system 200 (e.g., using a keyboard) to cause a desired plugin from a plugin library 250 to execute using desired parametric values of the user. Among other advantages, the system 200 enables a marketplace of third-party plugins to be provided to a user, using an interface that enables the user to search and execute desired plugins with a minimal number of inputs that can be successively provided through a common interface or input mechanism (e.g., keyboard). In this way, the system 200 enables the plugin search and execution process to be performed as a continuous or repeated user interaction. The result is a highly efficient interaction for the user, where the user can execute a desired plugin in a manner intended using a keyboard and/or common user interface. Moreover, the system 200 can implement the search and execution process in a manner that ensures input data for plugin execution is appropriately formatted or structured for a particular plugin that is identified through a search process, with no a priori knowledge of the plugins operations being required from the user.

In context of embodiments described, a plugin can correspond to a program that can execute on an end user device to provide additional or enhanced functionality to the interactive system 100. An end user can, for example, execute a plugin in connection with utilizing the interactive system 100 and creating or updating a design. Among other advantages, examples such as described below enable a user to search for and trigger execution of plugins using alphanumeric entry, such as provided through use of a keyboard. Thus, for example, a user can continuously or continuously use a keyboard to search for and trigger execution of individual plugins.

According to examples, plugin management system 200 includes a search user interface 210, a search component 220, a plugin interface component 230, a search index 240, a plugin library 250 and a developer interface 260. Depending on implementation, the plugin management system 200 can be implemented on a user computing device 10, 12, on a network computer system 150, and/or distributed between a user computing device 10, 12 and the network computing system 150.

Search Interface to Receive Search and Plugin Input

In examples, the search user interface 210 can be rendered through implementation of the interactive system 100. For example, the search user interface 210 can be provided as part of a design panel, or as a feature the user can access and use with a canvas. According to examples, the search user interface 210 includes a text entry box 208 that can receive alphanumeric input (e.g., from a keyboard) from the user. In some examples, the search user interface 210 can include additional interactive features, such as a preview window 215. As described with some examples, the text entry box 208 can receive (i) search input to identify a plugin, and (ii) plugin input to enable the user to specify parametric values for running the identified plugin from the search user interface 210. The preview window 215 can display entries for a search result (e.g., desired plugin of the user). As an addition or alternative, the preview window 215 can display prompts or predetermined plugin inputs which the user can select. Still further, in other variations, the search user interface 210 can include other types of interfaces and interactive elements.

Plugin Library

In examples, the plugin library 250 includes program files (e.g., executable files) which can execute at the selection of an end user in connection with the end user utilizing the interactive system 100 to create and/or update a design on a canvas. The plugins can be created by developers, including third-parties to a proprietor of the interactive system 100. In examples, each plugin can be executable at the option of a user to implement a process separate from the functionality of the interactive system 100. Accordingly, the plugins stored with the plugin library 250 can provide additional or enhanced functionality for use with interactive system 100.

In examples, a developer can interact with the plugin management system 200 to store a plugin file 255 (or set of files that are used at time of execution) with the plugin library 250. The plugin files 255 can include one or more executable files for the plugin, as well as for plugin execution logic 245. The plugin execution logic 245 can include code, program(s), programmatic processes and/or data which are accessed by the plugin management system 200 during a plugin search process, to prompt or facilitate the user in providing plugin input that is appropriately structured, formatted and/or sequenced.

Use of Plugin Execution Logic

In some implementations, the plugin execution logic 245 includes metadata specified by the developer, where the metadata includes parametric values that correlates to plugin inputs that a user can provide in connection with execution of the plugin. As an addition or alternative, the plugin execution logic 245 can be executed or otherwise utilized by the plugin interface component 230 of the system 200 to alter a configuration of the search user interface 210. For example, as described in greater detail, the system 200 can utilize the plugin execution logic 245 to identify prompts 249 that appear in the text entry box 208 during a plugin search and execution process. In examples, a prompt 249 corresponds to a visual cue, such as a textual cue (e.g., a word) that indicates a type, format, value (or range of value) or other input characteristic which the user should enter as plugin input, in order for the plugin to successfully execute as intended by the user. As described below, in some examples, a prompt 249 can be a textual element within the text box entry 208. In other examples, prompts 249 can appear as, for example, entries of the preview 215, where each entry corresponds to an option that the user can make in order to specify a corresponding parametric value.

The plugin execution logic 245 can be associated with prompts 249 and/or other interactive features that enable the user to provide specific parametric values to execute the selected plugin. In examples, the prompts 249 are formatted to appear as text-based suggestions with the search interface (e.g., within the text field of the search user interface 210) to prompt the user for a specific type of value (e.g., a selection of one option from a closed set of options, a numeric value that indicates a range, a free form alphanumeric string, etc.). In some examples, the plugin execution logic 245 identifies prompts 249 that are displayed to the user upon the user performing a search that identifies the particular plugin. The user can then utilize the search user interface 210 to (i) perform a search to identify a plugin of interest, (ii) specify parametric values in accordance with a sequence, format and/or structure to enable execution of the identified plugin, and (iii) trigger execution of the plugin using the specified parametric values. In some examples, the plugin execution logic 245 can also specify a set of default (or predetermined) parametric values that can be utilized to execute the plugin in absence of user input.

In variations, the plugin execution logic 245 is distributed, so that the plugin execution logic 245 is stored in whole or in part at a developer-specified network location, such as with a developer or third-party service. For example, the plugin files 255 can include a pointer (e.g., URL or link) that includes (i) a pointer (e.g., URL, link) to a remote network resource or location, and/or (ii) other data for accessing developer specified files at the specified location. The portion of the plugin execution logic 245 that is stored with the developer-specified location (e.g., such as provided by a third-party service) can include, for example, instructions executable by the plugin interface component 230, metadata that associates parametric values for the plugin with user input, prompts and/or other data for configuring the search user interface 210 and/or generating a separate input interface for the plugin.

As an addition or variation, the plugin execution logic 245 can provide for the system 200 to utilize other types of visual elements and/or configurations that alter the appearance or functionality of the text entry box 208 during a plugin search and execution process. Still further, the plugin execution logic 245 can be executed by the system 200 to create a separate input interface for the user during a plugin search and execution process where the corresponding plugin is identified.

In more detail, examples provide that the system 200 accesses and utilizes the plugin execution logic 245 to configure the search user interface 210 for a selected plugin, and to further enable execution of the plugin in a manner intended by the user. Accordingly, the plugin execution logic 245 is specific to the associated plugin. In some implementations, the plugin execution logic 245 can be provided as, for example, a data file that is uploaded by a developer through the developer interface 260. In variations, the plugin execution logic 245 can be provided by a developer through an interactive aspect of the developer interface 260. For example, the developer interface 260 can enable the developer to specify prompts 249 for the developer's plugin, where each prompt 249 identifies or indicates a possible parametric value for the user to enter or select. Additionally, the developer interface 260 enables the user to specify rules, conditions or other logic for when associated prompts 249 are to be rendered to the user (e.g., displayed within the text entry box 208). By way of example, the conditions and rules specify, for example, the sequence of timing of when specific prompts 249 can appear (e.g., an initial prompt, a subsequent prompt), the logical relationship of one prompt to another prompt (e.g., a set of prompts are dependent on the input provided to another prompt, etc.), and/or other conditions for which a given prompt may appear in the text entry box 208.

As an addition or variation, for a given plugin that is selected during a plugin search and execution process, the system 200 can implement a decision flow by which a user enters a series of inputs based on a logical schema of the plugin execution logic 245. As an addition or alternative, the system 200 can access the plugin execution logic 245 to provide prompt the user to make selection from multiple possible preselected parametric values. In such examples, the selections, sequence or timing and/or condition(s) under which the preselected parametric values are displayed to the user can be determined by the plugin execution logic 245.

Search Index

The search index 240 can associate descriptive terms with individual plugins of the plugin library 250. By way of example, the plugin files 255 can include search terms, such as descriptive terms that facilitate identification of the plugin through a search process. The descriptive terms can include terms that are characteristic to the plugin to facilitate identification of the plugin from other plugins of the plugin executable library 250. The descriptive terms can also include parameters terms that are used by a respective plugin during the plugin's execution. and execution process.

The search index 240 can be maintained separate or independent of the plugin library 250. For example, the search index 240 can be downloaded and local on a user computing device, while the plugin library 250 is available to the user computing device over a network. The search user interface 210 can include text entry box 208 to receive alphanumeric input from the user, and the search component 220 implements a search process to identify matching entries using the search index 240. The search component 220 can return a set of results (search results 211) to the search user interface 210. The search results 211 can include one or multiple entries which are displayed or presented to the user by the search user interface 210, with each entry identifying a matching item (e.g., plugin) from the search index 240.

In some examples, the search index 240 can also include data that identifies commands, files, objects and/or data items that can be used by the interactive system 100. In this way, the plugin management system 200 can enable the user to perform a universal search, where the search component 220 uses alphanumeric search input received via search user interface 210 to perform a search against search index 240. The search component 220 can identify a search result 211 comprising entries, with each entry corresponding to a plugin, command, file and/or data object. With selection of a plugin from the search result (e.g., user selects TAB or ENTER), the system 200 receives subsequent alphanumeric entry as plugin input for use in execution of the identified plugin.

Multimode Operation to Receive Search and Plugin Input

According to examples, the user interacts with the search user interface 210 to provide (i) a first set of inputs ("search input 209") to select a plugin, and (ii) a second set of inputs ("plugin input 207") to specify parametric values for use during execution of the plugin. According to examples, the plugin management system 200 implements multiple modes in connection with receiving user inputs (e.g., search user input 209 and plugin user input 207) via the search user interface 210. In particular, the plugin management system 200 implements a search mode in which a first set of user inputs (i.e., search input 209) is used to identify a particular plugin. Once the user selects a desired plugin, the system 200 switches to a plugin input mode, where a second set of inputs ("plugin input 207") are used as input for execution of the desired plugin. Each of the modes are described in greater detail below.

Search Mode

In the search mode, the search component 220 receives the search input 209 and performs a search using search index 240 to identify the search results 211, where the search result 211 includes one or more plugins from the plugin library 250. The user can select one of the plugins from the search result 211 using, for example, a keyboard. The search user interface 210 can generate preview window 215 to display entries of the search result 211. In examples, the user can interact with the preview window 215 to select one of multiple entries of the search result 211. In some examples, the user input can be provided through keyboard entry. For example, the user can use a keyboard to enter one or more character strings in the text entry box 208 to generate the search result 211, which is displayed to the user via the preview 215. The user can use arrow keys or other directional input (including pointer) to select a desired plugin from a portion of the search result 211 displayed in the preview 215. The user can then press TAB on the user keyboard to select the desired plugin (or other entry displayed through the preview 215).

In variations, the search component 220 implements alternative search processes to identify matching entries from the search index 240. For example, the search component 220 can (i) match search input 209 with any part of a descriptive term of a plugin stored with the search index 240, (ii) match search input 209 exactly to a descriptive term, (iii) match search input 209 with the beginning portion of a term, and/or (iv) utilize substitutions or "fuzzy" logic for a search term or portion thereof.

Still further, the search user interface 210 and search component 220 can combine to implement an incremental search. The search component 220 can perform a search of the search index 240 starting with a first character that the user enters with the search user interface 210, and subsequent character input can cause the search results in narrow. The search user interface 210 can provide preview 215 with each character input that the user enters, with the matching entries displayed in the preview 215 being reduced with each additional alphanumeric entry.

In other examples, the search component 220 can use the detected alphanumeric entry to search the search index 240 for matching items that include, for example, plugins, commands, files, data objects and other data items. The search component 220 can return a search result 211 that identifies one or more entries, where each entry corresponds to a matching item (e.g., plugin, command, file, data object or other data item).

In some examples, once the user selects a desired plugin, the search component 220 causes an identifier of the selected plugin to render as an object in the text entry box 208. The completion of the search process can transition the system 200 from the search mode to the plugin input mode.

Plugin Input Mode

In response to user selection of a plugin, the plugin management system 200 can switch to a plugin input mode. In the plugin input mode, plugin interface component 230 accesses the plugin execution logic 245 of the selected plugin from the plugin library 250, and configures the search user interface 210 based on the plugin execution logic 245 of the selected plugin. In an aspect, the search user interface 210 is configured to provide prompts 249 that enable the user to specify parametric values for executing the selected plugin through the search user interface 210. In examples, the plugin interface component 230 displays prompts 249 within the text entry box 208 of the search user interface 210, where the prompts 249 are specified by the plugin execution logic 245 of the selected plugin. The prompts 249 can specify or indicate parametric values that the user can provide as plugin input 207 for use in execution of the selected plugin. Still further, as described with some examples, the plugin interface component 230 can implement plugin execution logic 245 to generate other interactive features to facilitate the user in providing plugin input that identifies parametric values for execution of the selected plugin.

From the user's perspective, selection of a desired plugin results in the search interface being reconfigured to indicate prompts or other inputs which the user can make to specify parametric values for the desired plugin. Subsequent input entered by the user is received as plugin input 207 by the plugin interface component 230. In some implementations, the plugin input 207 can also be in the form of alphanumeric input that correspond to parametric values for running the selected plugin. In this way, the search input 209 and plugin input 207 can be entered by the user as a successive or continuous set of inputs which the user provides to search and execute the desired plugin. Further, the plugin input 207 may be provided by the user in connection with an identified plugin, and responsive to a set of prompts 249 (or other interactive elements specified through the plugin execution logic 245). In examples, the set of prompts 249 that are displayed to the user are determined from the plugin execution logic 245 of the matching plugin.

Accordingly, in the plugin input mode, the plugin interface component 230 can access and implement the plugin execution logic 245 from the plugin library 250 to (i) identify what prompts to display initially using the search user interface 210, (ii) identify input provided by the user through the search user interface 210 that specifies one or more parametric values for a corresponding set of parameter terms identified by a displayed prompt, and (iii) implement decision logic to determine which prompt to display (if any) after parametric values for a given set of displayed parameter terms are received. In some examples, the prompts 249 displayed to the user visually indicate or guide the user to enter one or more parametric values for the plugin in a particular format (e.g., numeric value, numeric value in a range, selection of one term from finite set of possible terms, etc.), structure (e.g., sequence of two parametric values), and/or type (e.g., selection input versus alphanumeric input). Once the plugin input is complete, the user can enter input (e.g., the user presses ENTER in keyboard) to trigger execution of the selected plugin, using parametric values specified by the plugin input. In this way, the search user interface 210, search component 220 and plugin interface component 230 combine to enable the user to enter successive inputs that are used to search and execute a desired plugin in an intended manner of the user.

In some variations, the plugin execution logic 245 is stored in whole or in part at a developer-specified network location, such as with a developer or third-party service. The plugin interface component 230 can be configured to access the developer-specified network location to retrieve and implement the plugin execution logic 245. In some implementations, the plugin files 255 of the developer include a link, URL or other identifier to the network location, and/or as well as other data (e.g., encryption key, credential data, etc.) to enable the plugin interface component 230 to utilize the plugin execution logic 245 stored at the network location.

In some examples, the plugin interface component 230 can implement the plugin input mode by displaying multiple entries for a selected plugin, where each entry identifies one or more parametric values for use with the selected plugin.

In some variations, the user can provide directional or scrolling input to change entries. Additionally, the user may interact with the search user interface 210 to change or modify the parametric value associated with a particular entry displayed in the preview 215.

As further described in examples, when trigger input 219 is provided by the user via the search user interface 210, the plugin interface component 230 can trigger execution of the corresponding plugin from the plugin library 250. The selected plugin is then deployed while the user is using the interactive system 100, in connection with content rendered on a canvas.

In some examples, the plugin interface component 230 can respond to selection of an entry that specifies a parameter term and parametric value by triggering the corresponding plugin to execute using the parameter and specified parametric value of the selected entry. Still further, in other variations, the plugin interface component 230 can respond to selection of an entry that specifies a parameter term by triggering the corresponding plugin to execute using the parameter specified in the selected entry and a default (or predetermined) parametric value. The plugin can then execute to, for example, provide additional or enhanced functionality for the user in connection with the user utilizing the interactive system 100. For example, a triggered plugin can modify the content 125 that is rendered on the canvas 122 using functionality provided by the triggered plugin. In some examples, the plugin interface component 230 stops running a selected plugin once the plugin performs desired operations using the specified or default parametric values.

Input Validation Logic

In some examples, the plugin interface component 230 implements validation logic to ensure user input is valid for the selected plugin. In some examples, the plugin interface component 230 can implement the validation logic to check whether the input provided by the user matches a format or value specified by a corresponding prompt 249, or by metadata that is associated with the prompt 249. The plugin interface component 230 can for example, match alphanumeric entry provided by the user to one of the prompts 249, or to metadata associated with the current prompt 249 that the user is providing input for.

In examples, the plugin interface component 230 implements the validation check in response to each alphanumeric entry of the user. If the validation check determines that one entry in the string of entries of a parametric term is invalid, the plugin interface component 230 can implement any one of a variety of corrective actions. In one implementation, the plugin interface component 230 can ignore the input that failed the validation check. In a variation, the input can be displayed, but a respective string that contains the invalid character is visually indicated as being invalid. For example, when a string for a parametric term is completed and matches a valid input, the plugin interface component 230 can display the string as an object (e.g., object representing the parametric term which the user entered). But if the user completes the string and one of the characters is deemed invalid, then the string is displayed in non-object form (e.g., as a string of characters). Still further, an invalid character or string can be highlighted, colored or otherwise visually marked to be invalid. Still further, in other variations, the plugin interface component 230 can autocorrect an invalid entry for the user, using auto-correct logic. Still further, the plugin interface component 230 can access the plugin execution logic 245 to determine the manner in which an invalid string or input is to be handled.

As an illustrative example, a desired plugin may enable the user to identify an image of a fish, and the prompt for the plugin may specify "color". The plugin interface component 230 can perform the validation check after each alphanumeric entry of the user. In a scenario where the user enters "b", "l" and "o", the plugin interface component 230 may determine the sting as being invalid when the "o" is received. The user may go back and correct the string (e.g., enter "u" and "e") or the user may determine that he or she accidentally selected the wrong plugin (e.g., the user was entering "blonde" for hair. In such an example, once the plugin interface component 230 determines that the string the user is entering for the plugin input 207 does not match a valid response, the plugin interface component 230 can provide a visual indication that the entered string is not valid for the particular plugin.

In some examples, the plugin interface component 230 implements validation logic that is specified by the plugin execution logic 245 of the selected plugin. In variations, the plugin interface component 230 includes validation logic that is implemented independent of the plugin execution logic 245.

Rich Media and Functional Plugin Interfaces

According to some examples, the plugin interface component 230 accesses and executes plugin execution logic 245 of a selected plugin from the plugin library 250 to render input interfaces that are separate from the search user interface 210. A developer can structure the plugin execution logic 245 to enable the plugin interface component 230 to execute code that is provided as part of the plugin execution logic 245, from which a separate plugin input interface can be rendered to the user. In some implementations, the plugin interface component 230 accesses the plugin execution logic 245 to generate a separate plugin input interface once the corresponding plugin is selected by the user. The plugin input interface can be rendered concurrently with, for example, the text entry box 208 of the search user interface 210. Through the plugin input interface, the user can be prompted or otherwise guided to provide plugin inputs that are used by the selected plugin during its execution.

In examples, the separate interface can include or provide rich media. In some implementations, the plugin interface component 230 utilizes an iframe when executing plugin execution logic 245 to render rich and/or dynamic input interfaces for the selected plugin. For example, the plugin interface component 230 can execute the plugin execution logic 245 to generate an interface that enables the user to specify an object (e.g., picture), and to dynamically provide input based on the user's prior input. As an addition or variation, the plugin interface component 230 can access the plugin execution logic 245 to select images or other media to render for prompting user input (e.g., display matching image results to a selected image and prompt the user for selection).

Furthermore, the plugin interface component 230 can render the plugin input interface to be dynamic. For example, the plugin execution logic 245 can specify input features that are conditional or sequenced, so that a prior user plugin input determines the input feature that is rendered to the user. For example, the plugin interface component 230 can implement the plugin execution logic 245 to generate input interface elements that are dependent on the user's selection or prior input. As an illustrative example, the plugin interface component 230 can generate a plugin input interface that displays a shape having characteristics that are determined by a user's selection (e.g., a user may select a shape from multiple possible shapes), or alternatively by a user's prior input (e.g., the user previously selected a rectangular shape, and the user is prompted to select from a rectangular shape). Through the dynamic interface provided by the plugin interface component 230, the user can enter a series of inputs that can in turn, be used in the execution of the selected plugin to create a flow chart of linked shapes on the canvas.

Still further, the plugin input interface generated by the plugin interface component 230 can enable the user to provide inputs of various types, and the features provided with the plugin interface can be based in part on the plugin input the user previously entered. Additionally, the plugin interface component 230 can, based on the plugin execution logic 245, generate the separate plugin interface based on plugin input the user initially enters via the text entry box 208. Thus, for example, the plugin interface component 230 can implement the plugin execution logic 245 to selectively generate the plugin interface separate from the text entry box 208. In this way, the type, format and logic used to prompt the user for input and/or receive input from the user can be determined by the plugin execution logic 245 of the selected plugin, as implemented by the plugin interface component 230.

Hidden Metadata

Still further, in some examples, the system 200 enables a developer to structure the plugin execution logic 245 of a plugin to include metadata that specify parametric values that coincide with plugin input provided by a user via the search user interface 210. The metadata may be hidden or transparent to the user. A developer can structure the plugin execution logic 245 to include multiple sets of metadata, where each metadata set associates a given set of parametric values with a corresponding plug-in input of the user. In response to receiving plugin input via the search user interface 210, the plugin interface component 230 identifies the metadata set that is associated with the received plugin input. In this way, the plugin interface component 230 can trigger the selected plugin to execute using parametric values specified by plugin inputs received via the search user interface 210 and/or parametric values specified with metadata set(s) that are associated with the plugin input(s).

By way of example, the plugin interface component 230 can implement the plugin execution logic 245 of a given plugin to display multiple options for the user, where each option corresponds to a possible plugin input that the user can provide via the search user interface 210. For example, based on the plugin execution logic 245, the plugin interface component 230 can provide multiple entries in the preview window 215, where each entry corresponds to a possible plugin input. The user can scroll or otherwise provide directional input in the preview window 215 to select one of the multiple possible plugin inputs. In examples, the plugin interface component 230 accesses plugin execution logic 245 of the selected plugin to identify a metadata set that is associated with the selected plugin input. The plugin interface component 230 can subsequently trigger the selected plugin to execute using parametric values specified in the identified metadata set.

As an illustrative example, the user plugin input can include a selection of an iconic representation of an object, and the plugin interface component 230 can access the plugin execution logic 245 to identify a metadata set that is associated with a particular icon. The plugin interface component 230 can trigger the identified plugin to execute using, for example, a unique identifier that is specified by the associated metadata and which distinguishes the icon from other icons of an icon library used by the plugin.

As another illustrative example, the plugin interface component 230 can access the plugin execution logic 245 to identify a metadata set associated with a particular user selection of an icon, where the parametric values identified by the associated metadata set correspond to one or more attributes reflected in the representation of the icon. For example, a user selection of an icon representing an adult male can be associated with metadata that correspond to attributes of "male" and "age 30-45 years old".

As another illustrative example, the plugin interface component 230 can execute plugin execution logic 245 of the selected plugin to render a map interface. For example, the plugin interface component 230 can initially provide prompts 249 for the user to enter a geographic region in the text entry box 208, and the plugin interface component 230 can further execute the plugin execution logic 245 to generate a map interface for the geographic region specified by the user's input. The plugin interface component 230 can render the map interface to enable the user to interact by providing an input. For example, the user can enter (e.g., using a keyboard) an address or location identifier (e.g., "Tenderloin" or city neighborhood), and the map interface generated by the plugin interface component 230 can be dynamically responsive to enlarge and center about the address or identifier the user provided. As an addition or variation, the user can provide a directional or pointer input (e.g., via a mouse) on a selected location that represents a corresponding geographic location within the represented geographic region. When the user provides plugin input to select the location within the represented geographic region, the plugin interface component 230 can identify a metadata set for the selected location of the user, where the identified metadata set identifies, for example, the geographical coordinates (longitude and latitude) of the selected location.

Historical Information

In examples, the plugin management system 200 can record the user's activity through the search user interface 210. The plugin management system 200 can utilize the historical information to (i) identify plugins which the user is likely interested in, and (ii) values that the user previously specified in connection with each of the identified plugins. The historical information can, for example, be used to identify plugins and/or values for the plugins, based on the user's most recent or most frequent selection. For example, the historical information can be used to indicate the plugin identifier that the user most recently or frequently selected. Additionally, the historical information can be used to indicate the values which the user most recently or frequently specified with the respective plugin identifier.

Methodology

Figure 3A:
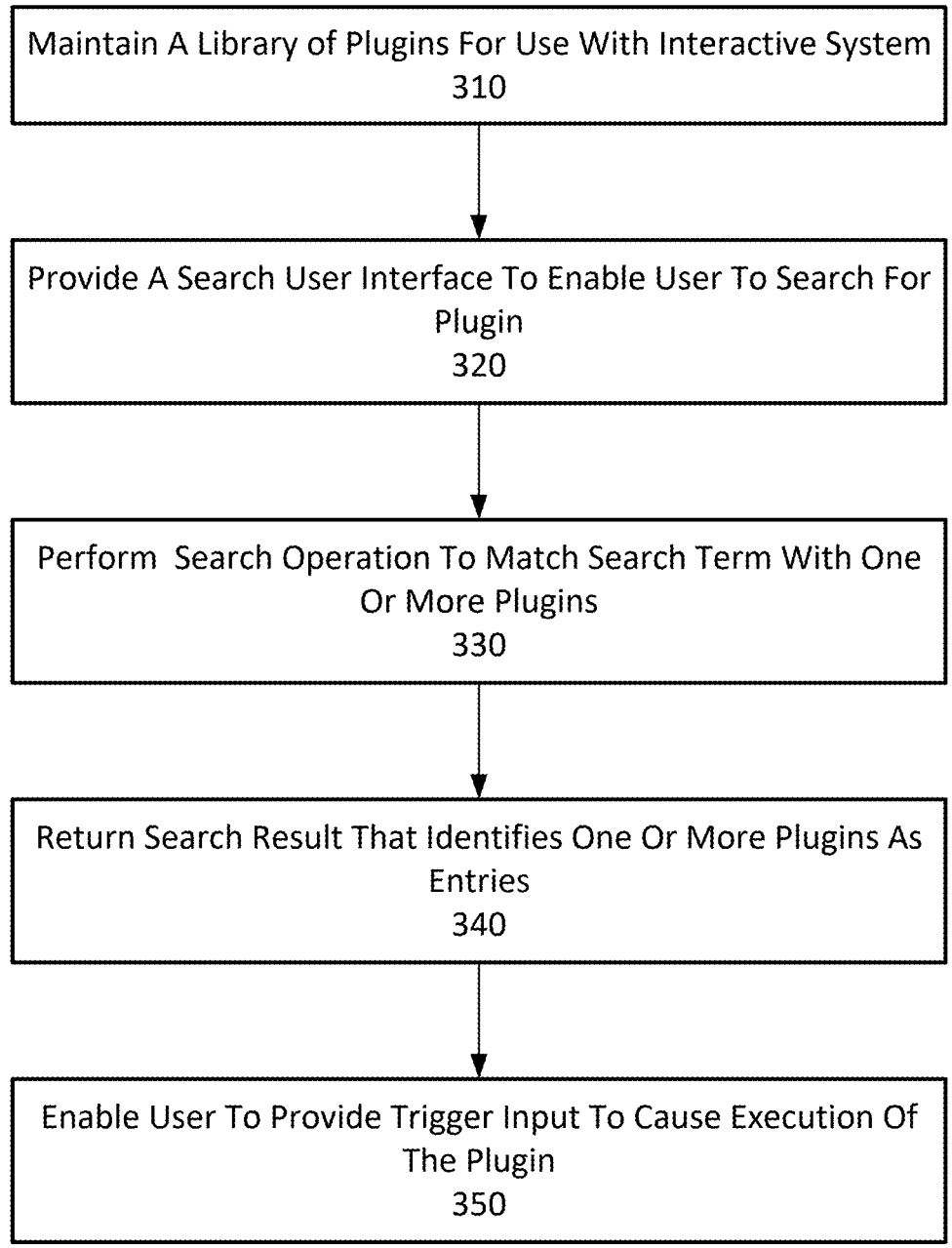
FIG. 3A illustrates a method for managing plugins in connection with utilizing an interactive system, according to one or more embodiments.
Figure 3B:
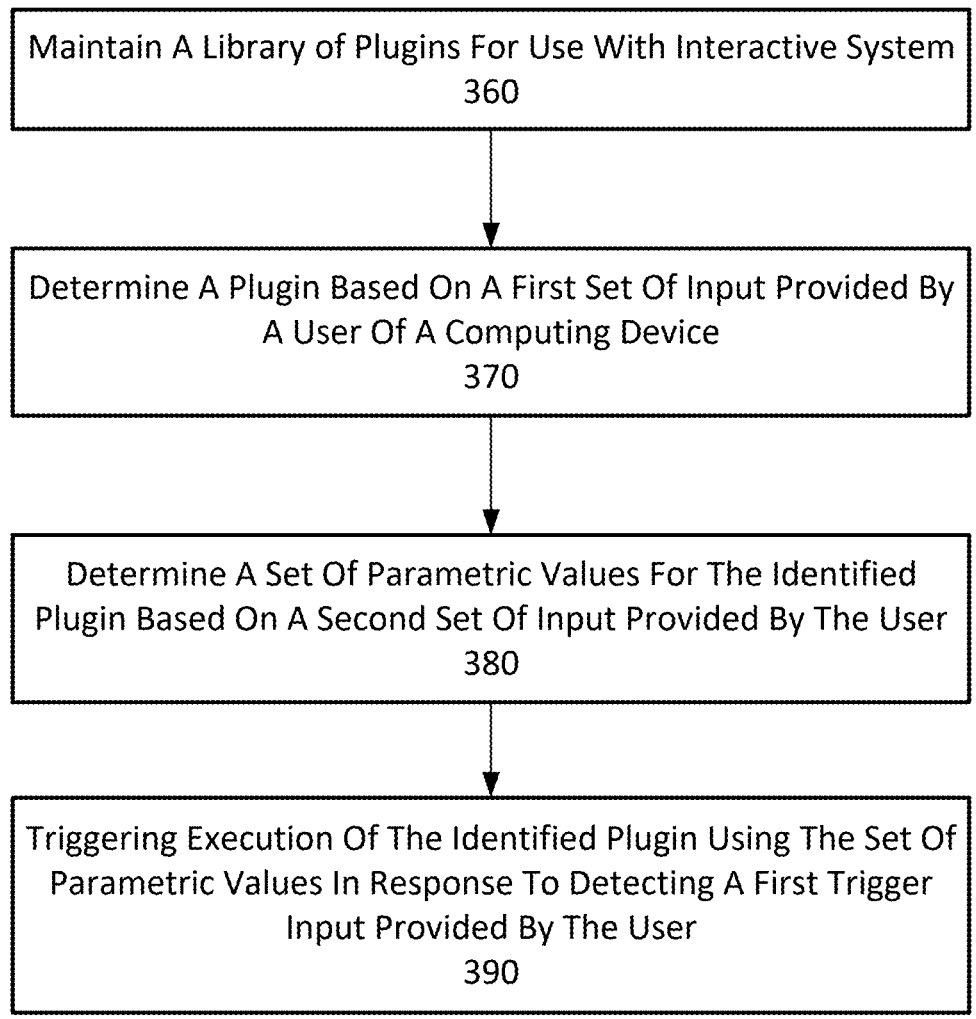
FIG. 3B illustrates another example method for enabling plugin execution, according to one or more embodiments.

FIG. 3A describes an example method for providing a plugin library, according to one or more embodiments. FIG. 3B illustrates another example method for enabling plugin execution, according to one or more embodiments. Examples such as described with FIG. 3A and FIG. 3B can be implemented by a plugin management system such as described with an example of FIG. 2. Further, examples such as described with FIG. 3A and FIG. 3B can be implemented in connection with an integrated system or platform that utilized by a user, such as described with FIG. 1A through FIG. 1C. Accordingly, reference is made to elements of FIG. 1A to FIG. 1C and FIG. 2 for purpose of illustrating a suitable component for performing a step or sub-step being described.

With reference to FIG. 3A, the plugin management system 200 includes plugin library 250 which maintains a plurality of plugins that are executable in connection with individual users operating the interactive system 100 (310). The plugin library 250 associates each plugin with one or more descriptive terms. In examples, the descriptive term(s) can be identified by the developer, and can include identifiers and/or descriptors about the functionality provided by the plugin. The plugin management system 200 can include developer interface 260 to enable a developer to upload a plugin, as well as descriptive terms and descriptors of the plugin.

The plugin management system 200 can provide a search user interface to enable the user to search for a plugin. For example, the search user interface 210 can be provided in connection with the interactive system 100 being implemented on a user computing device (320). The search user interface 210 can be in the form of, for example, a text entry box that receives alphanumeric entries from a user operating a keyboard.

In response to receiving the search term, the plugin management system 200 performs a search operation to match the search term with one or more plugins, using, for example, descriptive terms specified by the developer (330). In receiving the search term, the plugin management system 200 can detect a first set of input for the user, where the first set of input corresponds to the search term. In some implementations, the plugin management system 200 can perform a search based on detecting inputs of the user that correspond to individual characters of the search term. Thus, the detected inputs of the user can narrow a resulting search result.

The plugin management system 200 can return a search result that includes one or more entries which identify one or more plugins stored with the plugin library 250 (340). The user can provide a trigger input to cause execution of the plugin represented by a selected entry of the search result (350). In examples, the user can execute the plugin via alphanumeric input provided through the search user interface 210. For example, the user can utilize, for example, a keyboard to provide (i) alphanumeric input that specifies parametric values for execution of the selected plugin, and (ii) trigger input (e.g., via ENTER key) to trigger execution of the selected plugin.

With reference to an example of FIG. 3B, plugin management system 200 maintains a data store that identifies a plurality of plugins (360). As described with other examples, the plugin management system 200 can be implement as part of an integrated system or platform to provide a user with a canvas on which the user can generate and update content, such as designs, whiteboards, presentations, web pages and other types of content. The library of plugins can be maintained by the plugin management system 200 as part of a network service provided by the network computing system 150. Alternatively, the library of plugins can be stored locally on the user computing device, or distributed between the user computing device and the network computing system 150.

In examples, the plugin management system 200 determines a plugin based on a first set of input provided by a user of a computing device (370). In examples, the plugin management system provides a search interface to receive the inputs of the user. The inputs of the first set can include, for example, the alphanumeric entries that are entered through, for example, a text entry box of the search interface. The plugin management system 200 identifies a plugin from the library of plugins, based on the first set of inputs. The plugin management system 200 implements one or more search operations (responsive to inputs received by the user) to match the user input(s) with a matching plugin from the library of plugins.

Further, the plugin management system 200 determines a set of parametric values for the identified plugin based on a second set of input provided by the user (380). In some examples, the search user interface 210 can be used to display prompts that indicate a type or range of parametric values for the determined plugin. For example, the search user interface 210 can include a text entry box 208 or a preview panel 215 where the prompts can be provided. The user can provide input to select or otherwise specify values for the prompts.

In examples, the plugin management system 200 triggers execution of the identified plugin using the set of parametric values in response to detecting a first trigger input provided by the user (390). Among other advantages, a method such as described by examples simplify the interactions required from the user to identify and execute a desired plugin. For example, the user can use a common input device (e.g., keyboard) to search and execute a desired plugin, and further, without the user having a priori knowledge or familiarity of how the plugin works. Rather, the search user interface 210 can provide a guide as to how the plugin is to execute.

EXAMPLES

FIG. 4A through FIG. 4D illustrate an example of a search user interface for selecting and triggering execution of a desired plugin, according to one or more embodiments. FIG. 4E and FIG. 4F illustrate another example of a search user interface for selecting and triggering execution of plugins, according to one or more embodiments. FIG. 4G illustrates another example of a search interface that enables universal search, including plugin selection and execution, according to one or more embodiments. FIG. 4H through FIG. 4J illustrate another example of a search interface to invoke additional functional interfaces for interacting with plugins, according to one or more embodiments. FIG. 4K through FIG. 4O illustrate another example of a search interface that utilizes historical information, according to one or more embodiments. In describing examples of FIG. 4A to FIG. 4D, FIG. 4E to FIG. 4F, FIG. 4G, FIG. 4H through FIG. 4J, and FIG. 4K through FIG. 4O, reference is made to elements of FIG. 1 and FIG. 2 for purpose of illustrating components for implementing functionality as described. Accordingly, examples a search interface 400 as shown and described by FIG. 4A through FIG. 4O can be provided on a display 402 of a user computing device by interactive system 100. Further, the user can interact with search user interface 400 in a variety of ways, such as through keyboard, pointer (e.g., mouse) and/or touch input. The search user interface 400 is provided on a display 402 of a user computing device, in connection with a user utilizing the interactive system 100 to create, edit or collaborate on content rendered on a canvas. In examples, the interactive system 100 generate the 400 in response to a designated user input, such as a short-cut operation (e.g., provided through keyboard entry), soft-feature selection (e.g., iconic representation of feature) or pull down menu. Further, when the search interface 400 is provided, subsequent input received through the search interface 400 can invoke components of the plugin management system 200, as described with examples of FIG. 2.

Figure 4A:
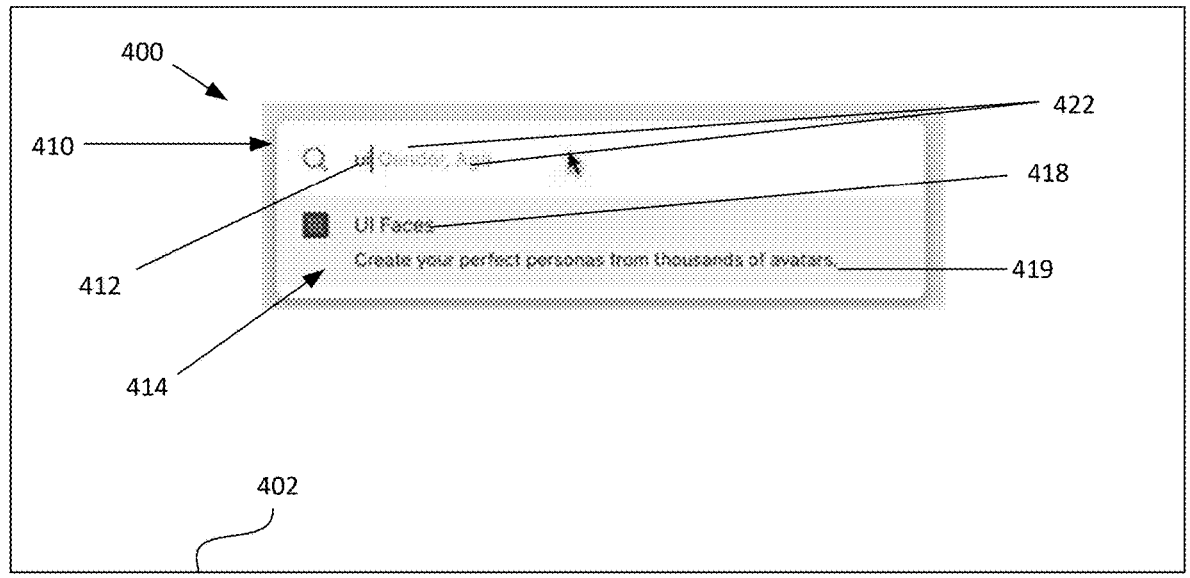
FIG. 4A through FIG. 4D illustrate an example of a search user interface for selecting and triggering execution of a desired plugin, according to one or more embodiments.

With reference to an example of FIG. 4A, the search interface 400 is provided on the display 402 to receive a first set of inputs 412 in a text entry box 410. The first set of inputs 412 can include alphanumeric characters (e.g., "ui") provided by, for example, the user through use of a keyboard or other alphanumeric entry mechanism. The search component 220 can match the first set of inputs 412 with descriptive terms that are maintained with the search index 240. The search component 220 can use the first set of inputs 412 to display a preview 414 that includes an identifier 418 (e.g., "UI Faces") to a matching plugin. The preview 414 can further include a description 419 of the identified plugin, which may be provided by the developer via, for example, the developer interface 260. The user can select the plugin from the preview 414 and/or through additional input. For example, the user may provide additional input through the keyboard (e.g., by pressing TAB) to signify selection of a particular entry that is displayed in preview 414 as part of the search result.

In some examples, one or more prompts 422 are displayed to the user in connection with a plugin that appears in the preview 414 in a pre-selected state (e.g., plugin identifier is the only entry identified in the preview as part of the search result, or the plugin identifier is highlighted in the preview). The search user interface 210 and/or search component 220 can retrieve one or more prompts 422 specified as part of the plugin execution logic 245 from the plugin data library 250. The prompts 422 can be displayed within search entry box 410. For example, one or more prompts 422 can be displayed as lightened text within the search entry box 410. The prompts 422 can correspond to parameter terms of the pre-selected plugin. The initial prompts 422, the sequence in which multiple prompts 422 are displayed, the type of input required for the input to be accepted and run as part of the plugin, and whether or not default values can be predetermined and associated with the particular parameter term are examples of variations that can be specified by the developer with the plugin execution logic 245. Thus, the plugin execution logic 245 can specify parametric values by parameter, type and configuration, to facilitate the user to trigger execution of the desired plugin through use of the keyboard.

Figure 4B:
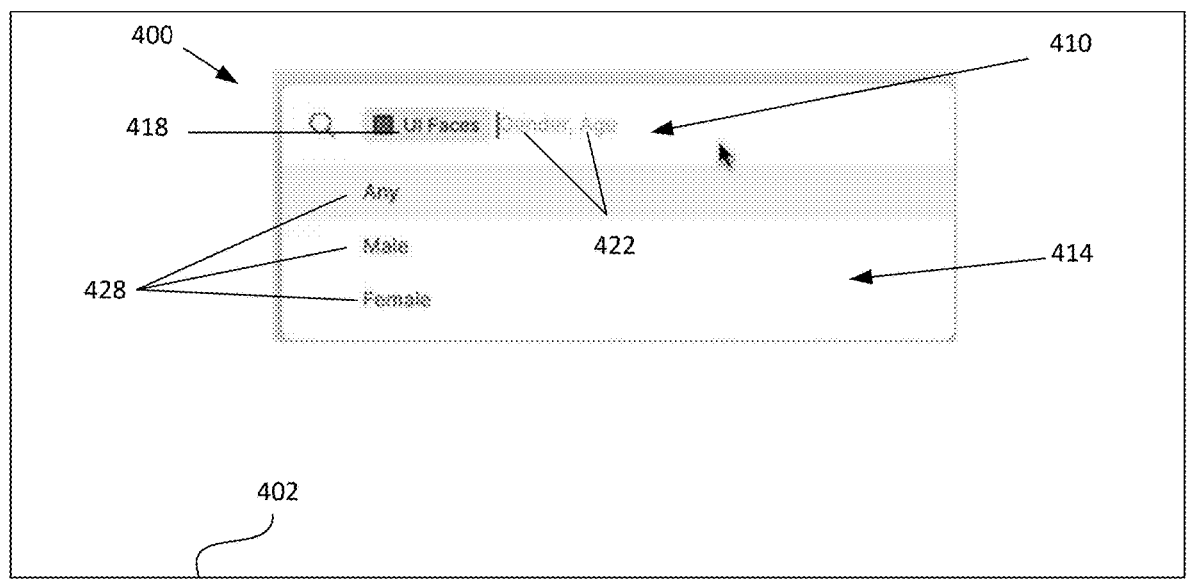

With reference to an example of FIG. 4B, the selected plugin identifier 418 is displayed as an object in the search box interface 410. For example, the user can select the plugin identifier 418 when it is shown in the preview 414 by pressing TAB, causing selection of the first (or only) entry of the preview 414, or by clicking the plugin identifier 418 when it appears in the preview 414. When selected, the plugin identifier 418 appears as an object, with pre-determined prompts 422 appearing adjacent to the object in the text entry box. As described in FIG. 4A, the pre-determined prompts 422 can be specified with the plugin execution logic 245 associated with the particular plugin. Thus, the appearance of the plugin identifier 418, as well as the prompts 422 and other behavior or characteristics of the plugin can be made plugin specific.

With further reference to an example of FIG. 4B, the preview 414 provided through interaction with the search interface 400 can be changed to display possible values for the displayed prompts 422. In the illustrative example shown, prompts 422 are sequenced so that the first parametric value the user provides is for gender, and the second parametric value is for age. In connection with the first parametric value, preview 414 displays a set of possible values 424 from which the user can make a selection. For example, the user can provide keyboard input (e.g., directional input, TAB, or other combination) or other types of input to select one of the possible values 424 as a selection of a parametric value for the given parameter term represented by the first prompt 422.

Figure 4C:
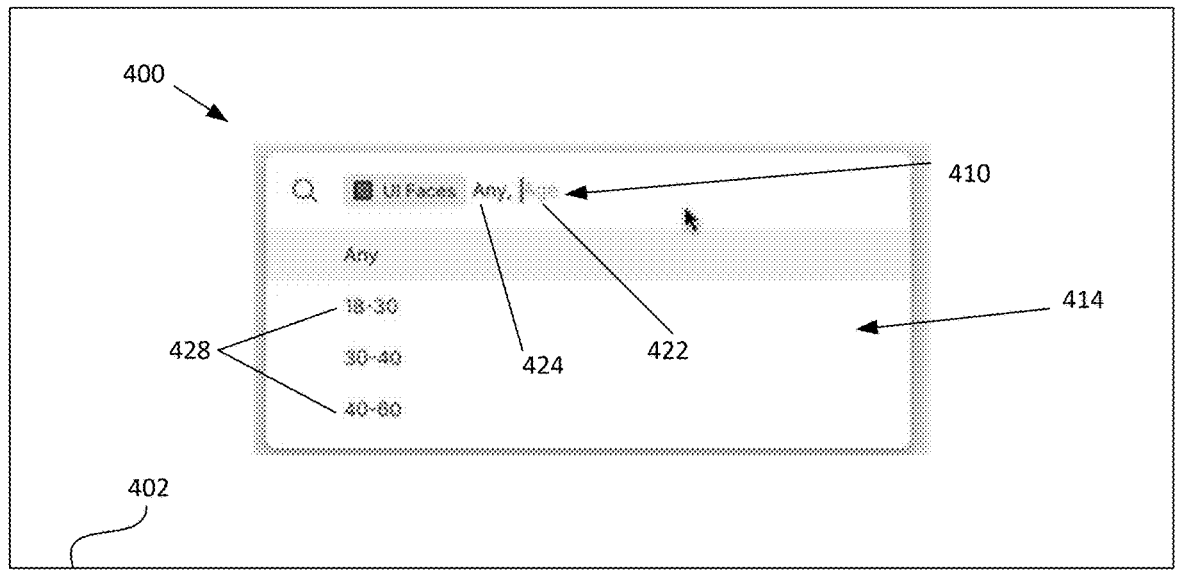

As illustrated by an example of FIG. 4C, when selection of the possible values is made for the first prompt 422, the text box interface 410 of search interface 400 displays possible parametric values 428 specified by the plugin execution logic 245 for the parameter term represented by the second prompt 422. The preview 414 is updated to display indicators of possible parametric values 428 for the second prompt 422 (e.g., "age"). The search box interface 410 can display the selected parametric value 424 for the first prompt 422, adjacent to the selected plugin identifier 418. Each of the possible parametric values 428 for the second prompt 422 can correspond to a range of age values (40-60), or alternatively, to a particular age value (e.g., "45", "any"), depending on the input the user specifies. The user can specify the particular value for the second prompt 422 using a keyboard or other input device. In this way, the possible input values, value types and type of input which may be accepted as used input can be specified by the developer with the plugin execution logic 245.

Figure 4D:
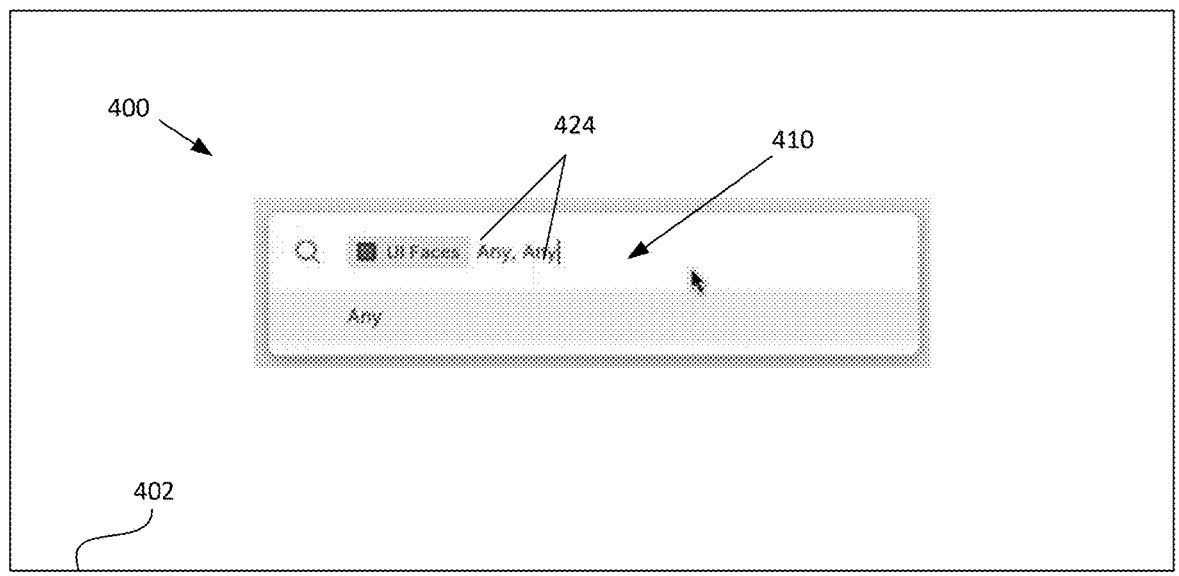
Figure 4E:
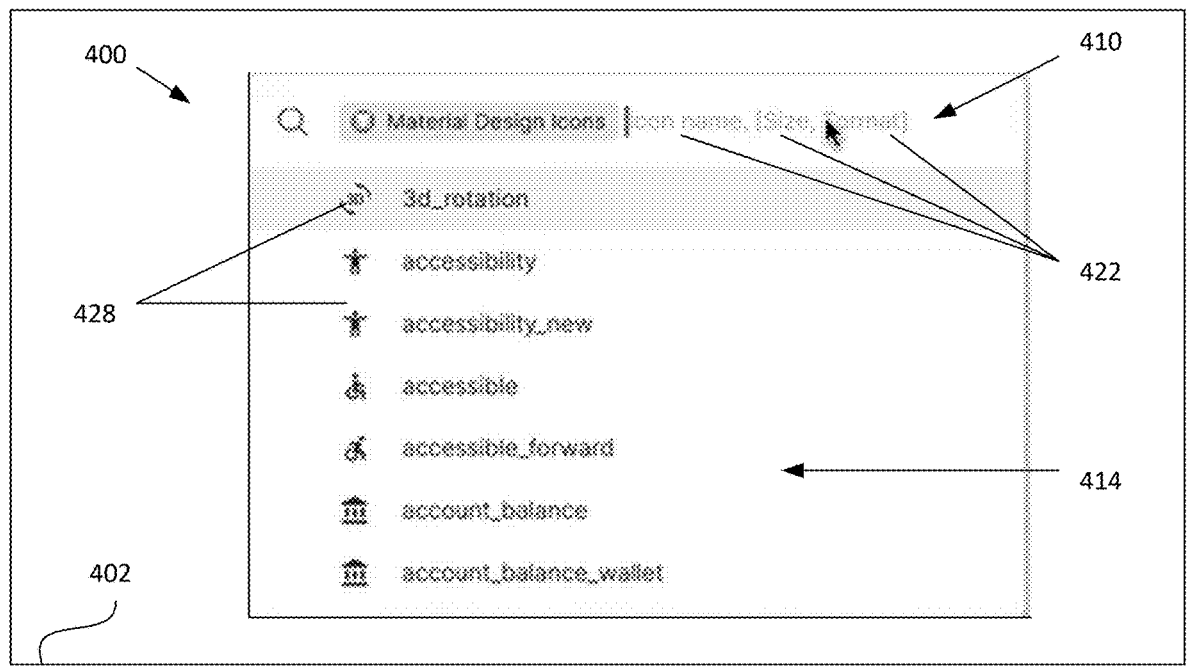
FIG. 4E and FIG. 4F illustrate another example of a search user interface for selecting and triggering execution of plugins, according to one or more embodiments.
Figure 4F:
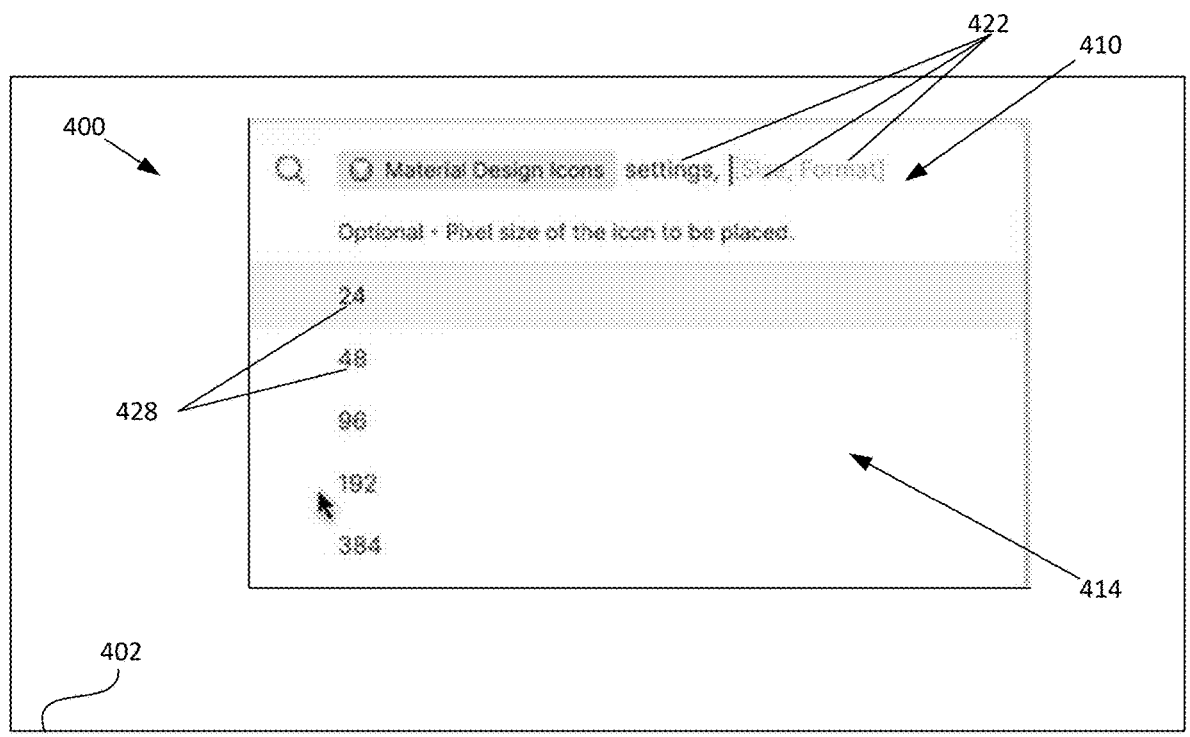
Figure 4G:
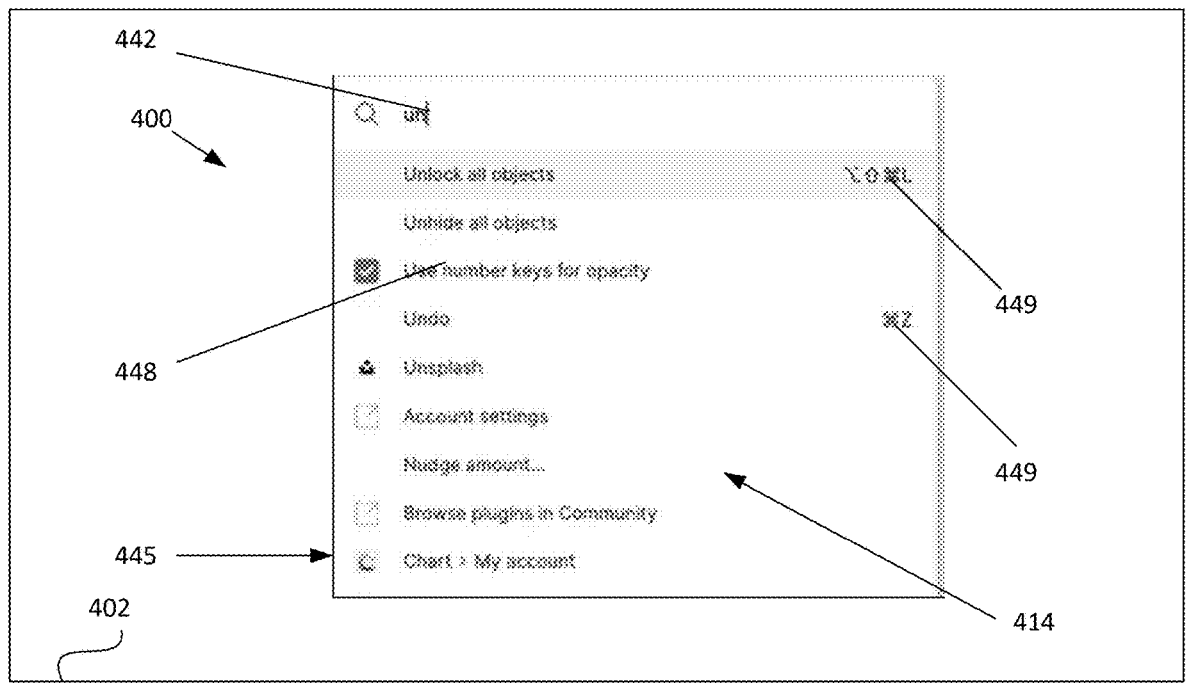
FIG. 4G illustrates another example of a universal search user interface that enables universal search, including plugin selection and execution, according to one or more embodiments.
Figure 4H:
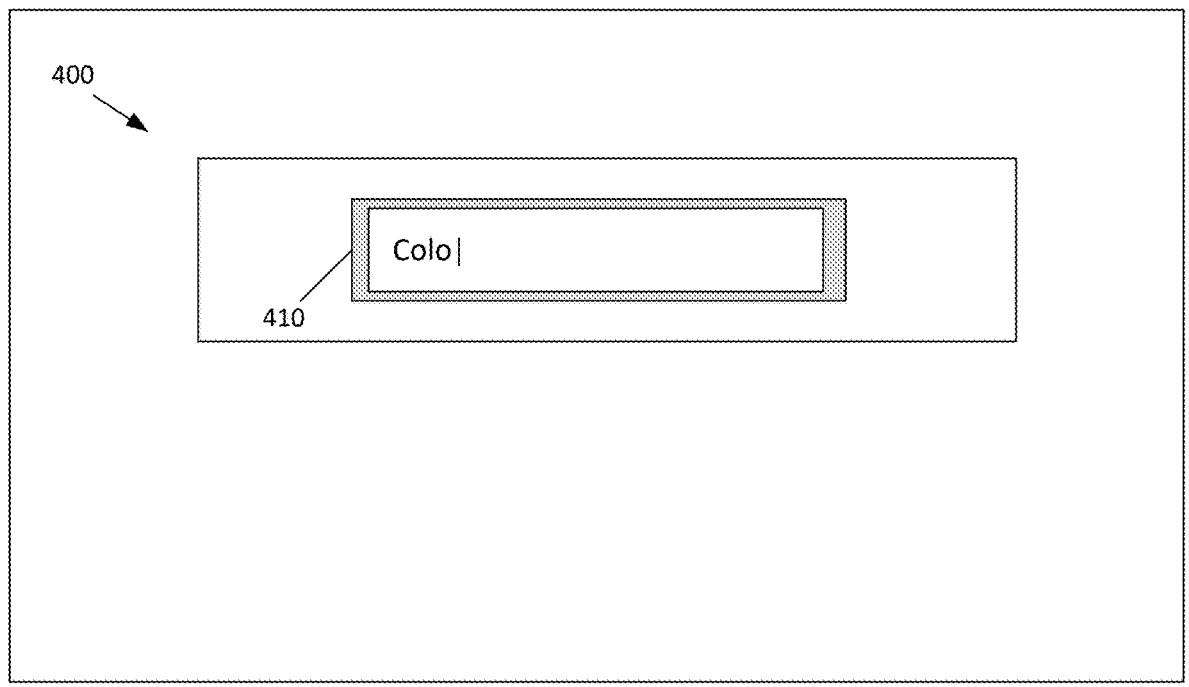
FIG. 4H through FIG. 4J illustrate another example of a search interface to invoke additional functional interfaces for interacting with plugins, according to one or more embodiments.
Figure 4I:
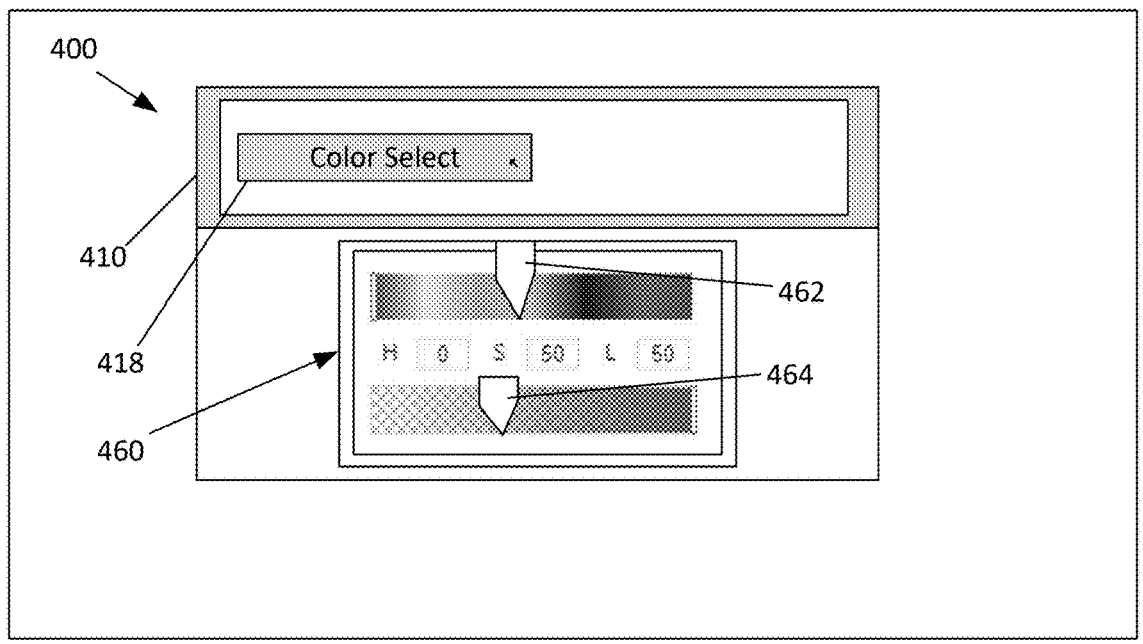
Figure 4J:
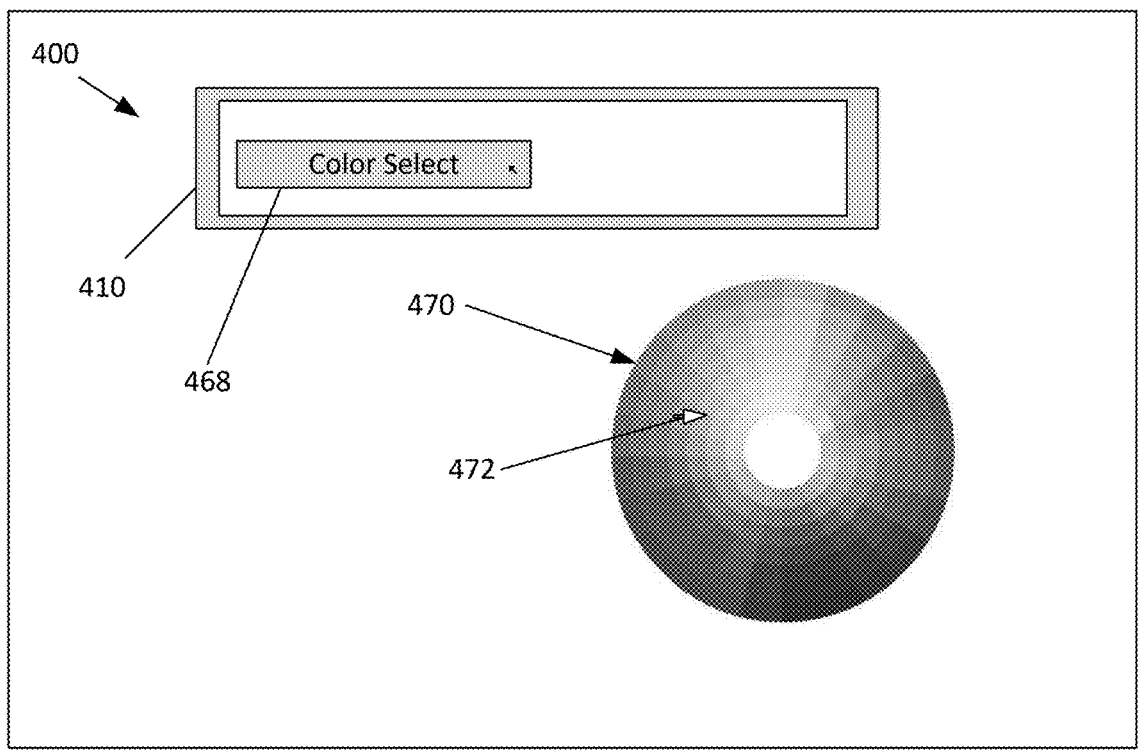

FIG. 4D furthers the example illustrated by FIG. 4A through FIG. 4C, to illustrate the case where the user has selected a plugin, and also specified one or more parametric values indicated by prompts 422 (FIG. 4C). In such case, the search box interface 410 displays the parametric values 424 for the parameter terms represented by the respective prompts. The user can provide trigger input (e.g., ENTER on the user keyboard) to trigger execution of the selected plugin, using the specified parametric values during the execution of the plugin. The plugin executes to perform an operation that changes, for example, the design under edit, the canvas or the design panel.

With reference to an example of FIG. 4E and FIG. 4F, the search interface 400 can be provided on the display 402 to implement a preview 414 that include iconic or graphical representations of an output of the plugin. As described, the appearance and behavior of the preview 414 in connection with the rendering of plugin parameters and values can be specific to the plugin. Upon the user providing a first set of inputs to select a plugin (e.g., "Material Design Icons"), the preview 414 displays possible parametric values 424 for the parameter term indicated by a first prompt 422 (e.g., "Icon Name"). The possible values 428 which the user can select can be displayed in scrollable form with the preview 414. Thus, for example, the developer can configure the preview 414 to enable scrolling or directional input (e.g., using directional arrows of the keyboard) to accommodate the number of possible choices the user may have for the parametric value of the parameter term represented by any of the prompts 422. Additionally, in some examples, each possible value 428 is associated with hidden metadata that can identify specific parametric values for use at the time the plugin executes.

In an example shown, the parametric values are displayed with the preview 414 in alphabetical order. However, the plugin execution logic 245 can specify alternative orders, including, for example, specifying the most recent or most commonly used parametric value to appear first in the list provided with preview 414. Once the parametric value for the first prompt 422 is selected, possible parametric values 428 for the parameter term represented by the second prompt 422 can be displayed as part of the preview 414. Likewise, the selected parametric value 424 for the first prompt can be displayed in the search box interface 410.

With reference to FIG. 4G, examples provide that the plugin management system can implement the search interface 400 to include functionality that extends beyond plugin search and execution. As illustrated by FIG. 4G, the search interface 400 can be implemented in, for example, alternative modes, including a universal search mode in addition to a plugin or plugin input mode. In particular, the search interface 400 can be implemented as part of the universal search feature of the interactive system 100. For example, search index 240 can maintain descriptive terms and identifies for plugins, as well as commands, data objects, files, tools and other types of items which can be used with the interactive system 100. Further, the search index 240 can include local or account specific index or search resources, such as file names, templates, objects, etc. In such examples, a first set of alphanumeric input 442 can generate a search result 445 that is displayed as part of preview 414, with individual entries 441 identifying plugins, as well as commands, data objects, files, tools, etc. The preview 414 can be scrollable using, for example, directional input provided through keyboard. Alternatively, entries 448 which represent plugins can be selected using a shortcut key combination, such as shown by indicators 449.

With examples such as illustrated by FIG. 4A to FIG. 4D, FIG. 4E to FIG. 4F, and FIG. 4G, the type of input which a user can provide can be specified as part of the plugin execution logic 245. For example, to specify a parametric value for a selected plugin, the plugin execution logic 245 can enable the user to provide input that corresponds to directional input (e.g., through directional keys) and selection input (e.g., pressing ENTER or TAB). Alternatively, the plugin execution logic 245 can specify the type of input that can be received as being numeric entry, but not text entry. As another example, the plugin execution logic 245 can enable the user to specify alphanumeric input so long as the alphanumeric input as entered in succession matches with one of the options displayed in the preview. As still another example, the plugin execution logic 245 can enable the user to specify free-form alphanumeric input which can be received as a parametric value of a corresponding parameter term, free of predetermined format or structure. Depending on implementation, the plugin execution logic 245 can thus enable a developer to restrict (or not) the input the user can provide by data type, format, structure or other consideration. Furthermore, the plugin execution logic 245 can specify functional behavior or other configurations for how the preview 414 is presented to enable the user to select parametric values for their plugin.

With reference to examples illustrated by FIG. 4H through FIG. 4J, the search interface 400 can be used to invoke additional functional interfaces for interacting with plugins. In examples, the plugin management system 200 can implement plugin execution logic 245 to generate separate functional interfaces for enabling the user to enter parametric values for execution of the plugin. In an example illustrated by FIG. 4H, the user interacts with the text entry box 410 of search interface 400 to specify a search entry (e.g., "Colo"). The search component 220 implements a search operation to identify a matching plugin (e.g., "Color Selector").

In examples illustrated by FIG. 4I and FIG. 4J, once the plugin is identified, the text entry of the user is displayed as a plugin identifier 418. For example, the plugin identifier 418 can be displayed within the text entry box 208 as an object. As described with other examples, the selection can coincide with the search interface 400 switching to a plugin input mode, to enable the user to specify parametric input for the identified plugin.

In an example illustrated by FIG. 4I, the identification of the particular plugin can also coincide with a plugin input interface 460 being provided, separate from the search interface 400. In example, the plugin input interface 460 can be implemented using plugin execution logic 245 associated with the identified plugin. For example, the plugin interface component 230 executes the plugin execution logic 245 of the identified plugin to generate the plugin interface 460 (e.g., color picker) for enabling the user to enter parametric input. The plugin interface 460 can be generated separate from the search interface 210, such as in a region adjacent to the search interface 400. Thus, for example, the plugin input interface 460 460 can be generated concurrently and/or in place of the search interface 400. In examples, the plugin interface 460 can include rich media and graphics, such as implemented with an iframe, so as to enable a dynamic interface from which the user can indicate parametric values for use in execution of the plugin. Further, the plugin interface 460 can be dynamic. For example, the user can slide or otherwise manipulate an input feature 462, 464 (e.g., sliders) to select a desired value. Based on the input, the position of the input features 462, 464 can be changed. Metadata can be associated with the selected position of the input feature 462, 464, where the metadata identifies one or more parametric values (e.g., selected hue for execution of the selected plugin). The selected plugin can then be executed with the parametric values specified by the user's manipulation of the input features.

In a variation illustrated by FIG. 4J, the functional interface that can be provided with the search interface 400 can be configured based on logic associated with the plugin. For example, the plugin interface component 230 can execute the plugin execution logic 245 to generate a second plugin interface 470 (e.g., color wheel) that enables dynamic user interactions. In example shown, the user can move a pointer 472 or other input mechanism (e.g., keyboard) over a color wheel or palette in order to make a selection of a desired hue. The plugin interface component 230 can associate the user's position selection with metadata that identifies the parametric values for the selected plugin. Once the user makes the selection, the user can trigger the plugin to execute with the identified parametric values.

Figure 4K:
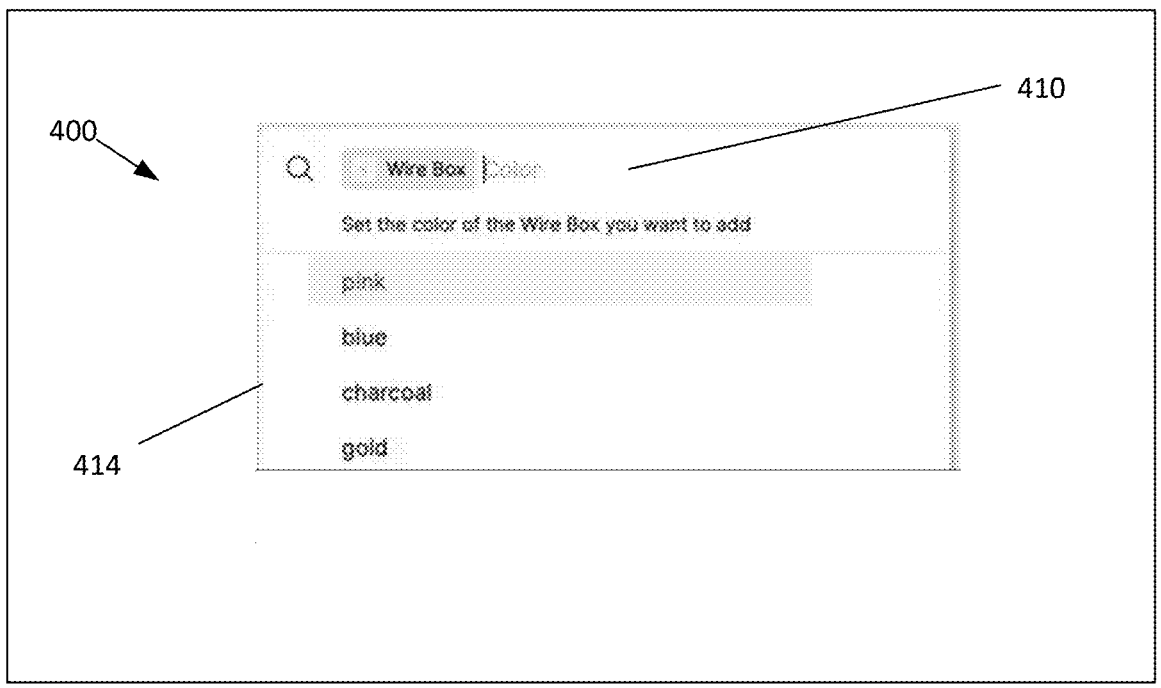
FIG. 4K through FIG. 4O illustrate another example of a search interface that utilizes historical information, according to one or more embodiments.
Figure 4L:

FIG. 4K and FIG. 4L illustrates another example in which the search interface 400 provides the user with plugin search and input history. As illustrated in FIG. 4K, the plugin identifier 418 is displayed in the text box 410, along with a prompt 422 that is pre-associated with the identified plugin. Further, preview panel 414 indicates possible or alternative values for the prompt 422, from which the user can make selection (e.g., select pink).

As illustrated by FIG. 4L, when the user makes a selection of a possible value for the identified plugin, the user's selection is recorded and used again in a subsequent instance when the plugin is identified through the search interface 400. In this way, the user's input for the value(s) of the prompt(s) 422 is recorded as historical information, and the historical information is used by the interactive system 100 to populate (or pre-populate) the value used for the prompt(s) 422 of the identified plugin. The value selection for the prompt 422 can be displayed in the text box 410 and confirmed by the user or replaced by another user selection.

Figure 4M:
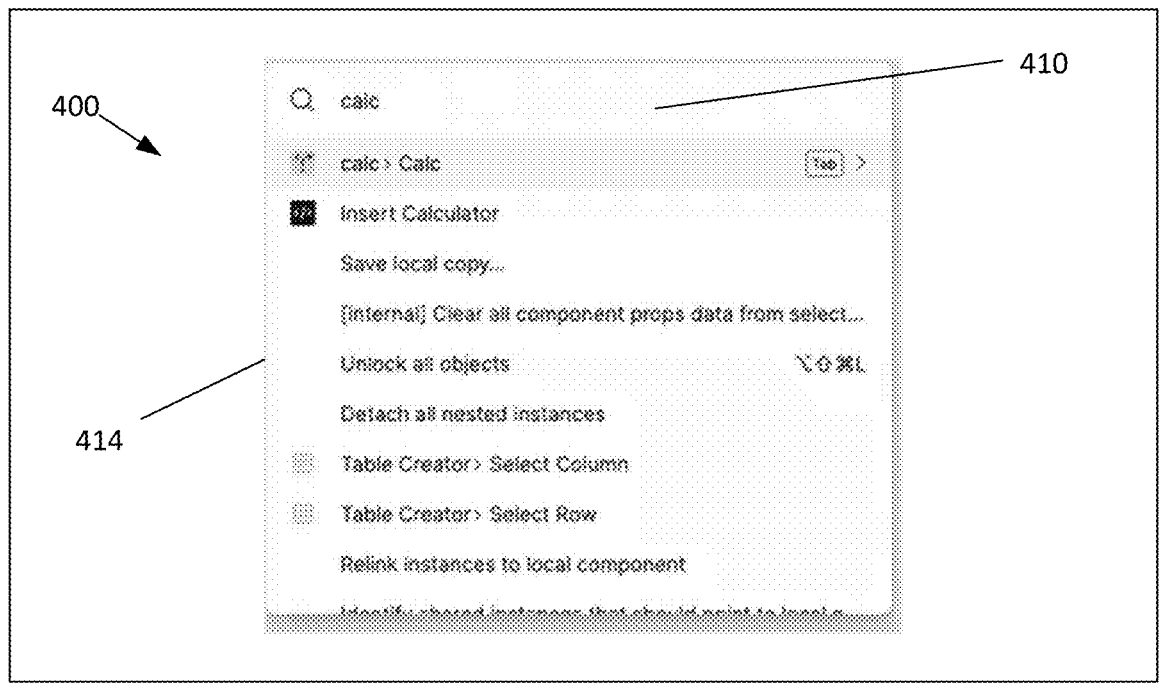
Figure 4N:
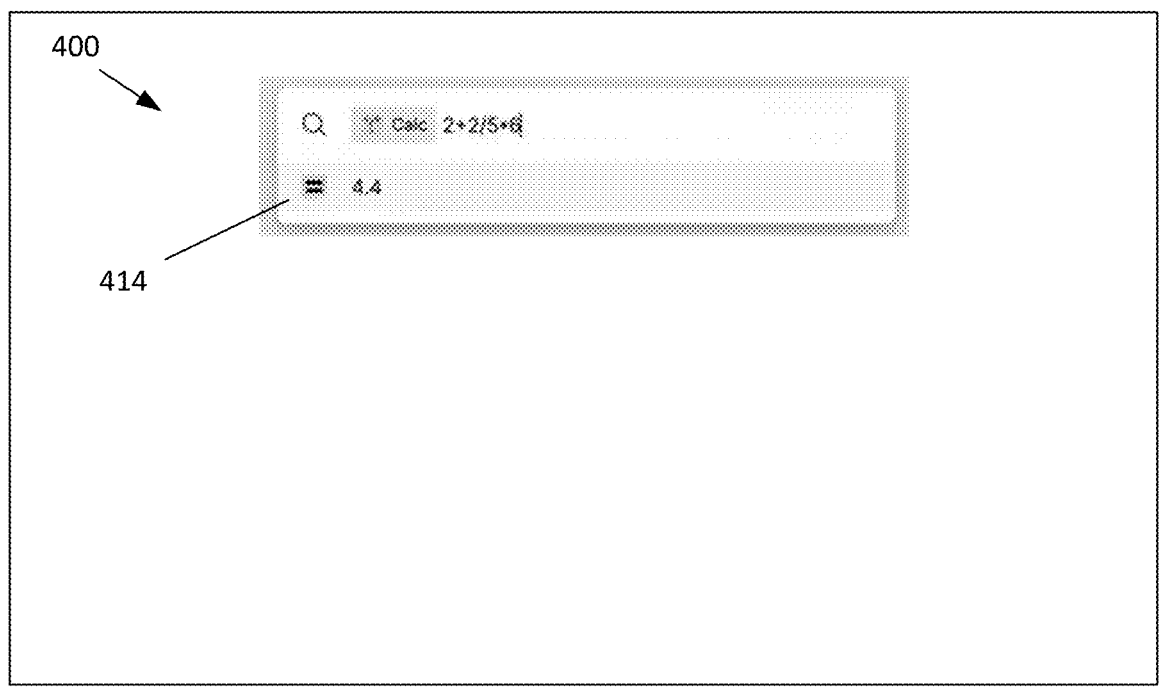

FIG. 4M and FIG. 4N illustrates another example where the search interface 400 utilizes historical information that coincides with calculated or inferred input, determined by the user's prior interaction with the plugin through the search interface 400. In FIG. 4M, the user interacts with the search interface 400 to enter characters for identifying a plugin (e.g., "calc") from a plugin library.

In an example illustrated by FIG. 4N, the user can enter (e.g., within the search interface 400) parametric input, such as input for calculating a result. The PEL 245 associated with the identified plugin calculates or otherwise infers a determined value 444 from the input entered subsequent to the identification of the plugin. In an example shown, the value 444 is displayed in the preview panel 414. In other examples, the value 444 is displayed adjacent to the search interface 400. Still further, in other variations, the value 444 is a parametric input for use with execution of the identified plugin, and selection of the value 444 is used by the plugin to determine or generate another output from the plugin.

Figure 4O:
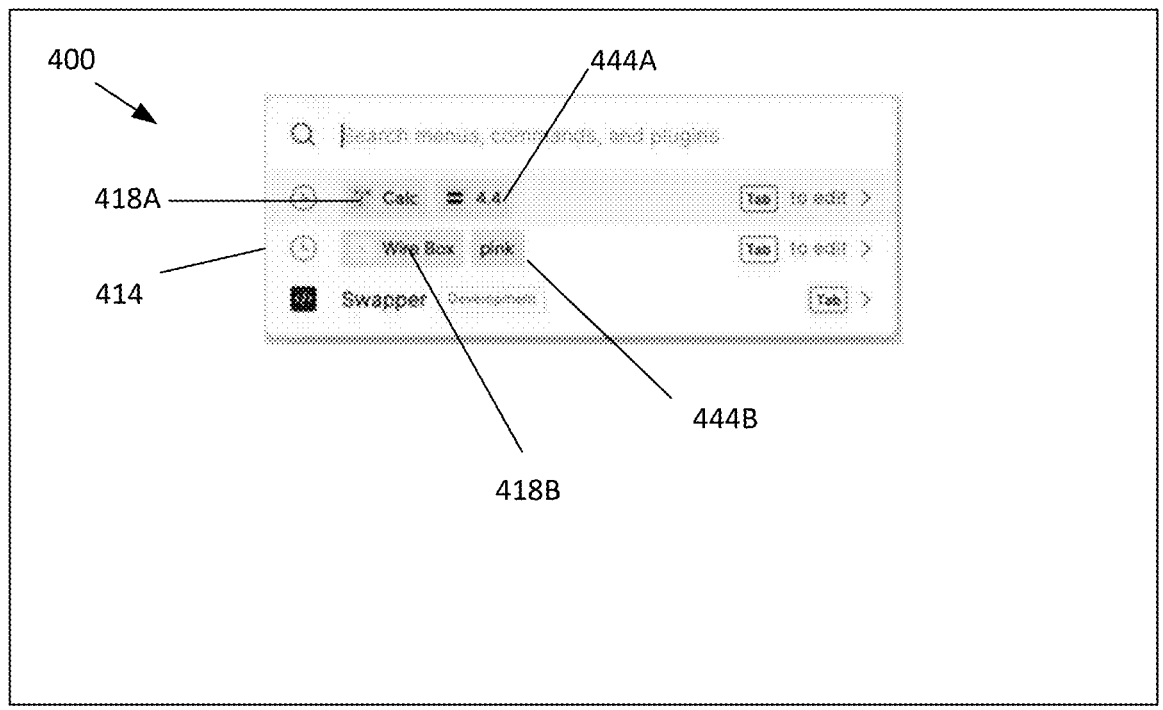

In an example illustrated by FIG. 4O, the user's prior interaction with the search interface 400 results in a history of the user's prior selections being displayed with the search interface 400. In examples, the history 415 of the user's selection are displayed in the preview panel 414. For example, the preview panel 414 can display the most recent plugin identifiers 418A, 4188 in the preview panel 414, along with the most recent parametric values 444A, 4448 used or determined with the identified plugins. For example, the recent parametric values 444A, 4448 of the identified plugins can include prior selections (e.g., "pink"), or determined values from prior parametric input (e.g., 4.4). Selection of the plugin identifiers 418A, 4188 may result in i) automatic population of the text entry box 410, so that the selected plugin identifier 418A, 4188 is displayed, along with the corresponding parametric value, or ii) automatic execution of the selected plugin, using the parametric values 444A, 444B.

While examples illustrated by FIG. 4K through FIG. 4O illustrate use of historical information to determine recent selections, in variations, the historical information can determine most popular or most likely user selections.

Network Computer System

Figure 5:
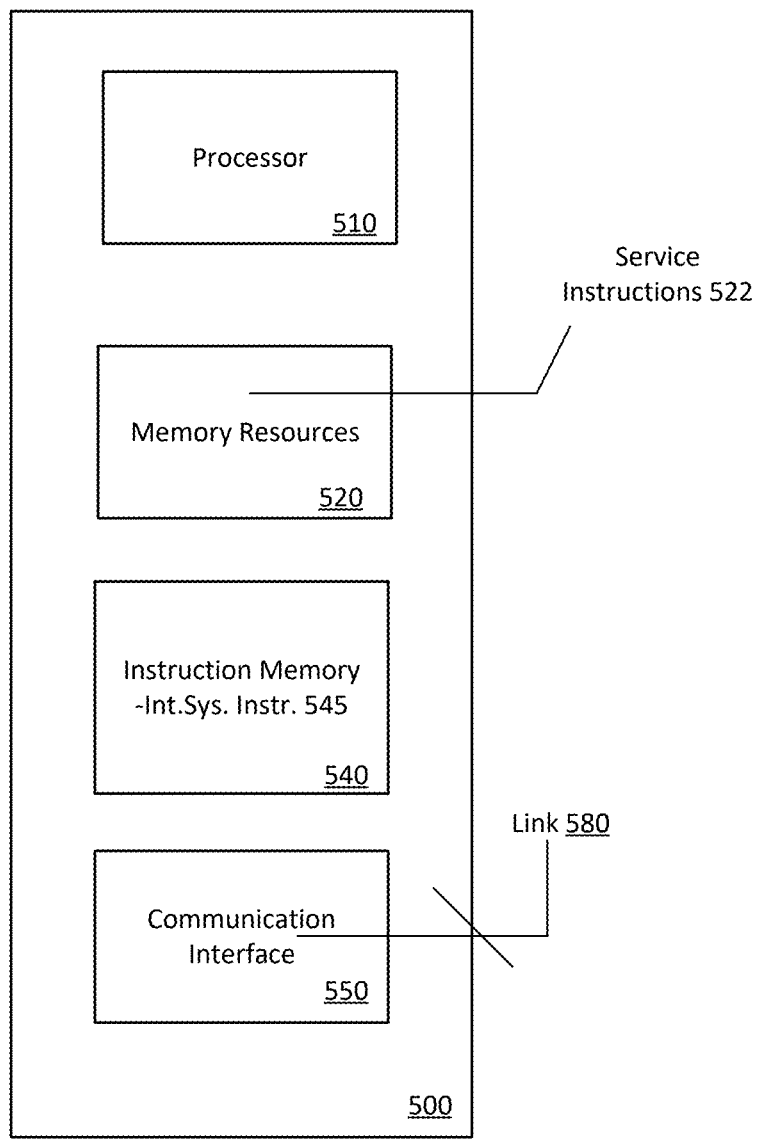
FIG. 5 illustrates a computer system on which one or more embodiments can be implemented.

FIG. 5 illustrates a computer system on which one or more embodiments can be implemented. A computer system 500 can be implemented on, for example, a server or combination of servers. For example, the computer system 500 may be implemented as the network computing system 150 of FIG. 1A through FIG. 1C, and further utilized by a plugin management system 200 of FIG. 2.

In one implementation, the computer system 500 includes processing resources 510, memory resources 520 (e.g., read-only memory (ROM) or random-access memory (RAM)), one or more instruction memory resources 540, and a communication interface 550. The computer system 500 includes at least one processor 510 for processing information stored with the memory resources 520, such as provided by a random-access memory (RAM) or other dynamic storage device, for storing information and instructions which are executable by the processor 510. The memory resources 520 may also be used to store temporary variables or other intermediate information during execution of instructions to be executed by the processor 510.

The communication interface 550 enables the computer system 500 to communicate with one or more user computing devices, over one or more networks (e.g., cellular network) through use of the network link 580 (wireless or a wire). Using the network link 580, the computer system 500 can communicate with one or more computing devices, specialized devices and modules, and/or one or more servers.

In examples, the processor 510 may execute service instructions 522, stored with the memory resources 520, in order to enable the network computing system to implement the network service 152 and operate as the network computing system 150 in examples such as described with FIG. 1A through FIG. 1C.

The computer system 500 may also include additional memory resources ("instruction memory 540") for storing executable instruction sets ("interactive system instructions 545") which are embedded with web-pages and other web resources, to enable user computing devices to implement functionality such as described with the interactive system 100.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 6:
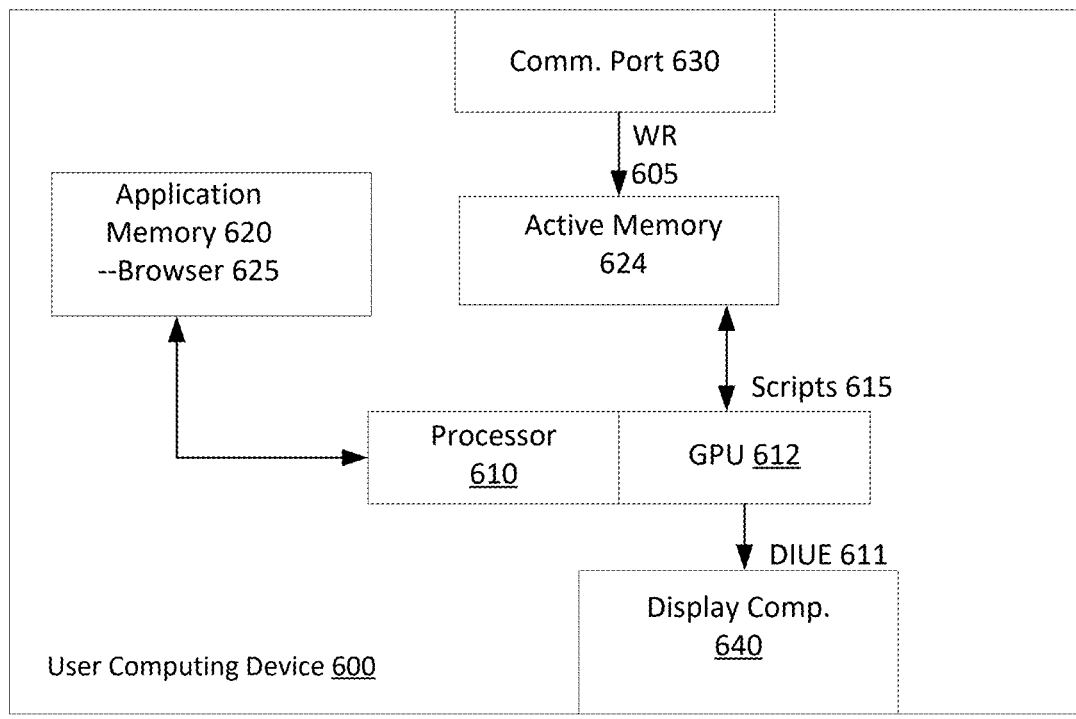
FIG. 6 illustrates a user computing device for use with one or more examples, as described.

FIG. 6 illustrates a user computing device for use with one or more examples, as described. In examples, a user computing device 600 can correspond to, for example, a workstation, a desktop computer, a laptop or other computer system having graphics processing capabilities that are suitable for enabling renderings of design interfaces and graphic design work. In variations, the user computing device 600 can correspond to a mobile computing device, such as a smartphone, tablet computer, laptop computer, VR or AR headset device, and the like.

In examples, the computing device 600 includes a central or main processor 610, a graphics processing unit 612, memory resources 620, and one or more communication ports 630. The computing device 600 can use the main processor 610 and the memory resources 620 to store and launch a browser 625 or other web-based application. A user can operate the browser 625 to access a network site of the network service 152, using the communication port 630, where one or more web pages or other resources 605 for the network service 152 (see FIG. 1A through FIG. 1C and FIG. 2) can be downloaded. The web resources 605 can be stored in the active memory 624 (cache).

As described by various examples, the processor 610 can detect and execute scripts and other logic which are embedded in the web resource in order to implement the interactive system 100 (see FIG. 1A through FIG. 1C). In some of the examples, some of the scripts 615 which are embedded with the web resources 605 can include GPU accelerated logic that is executed directly by the GPU 612. The main processor 610 and the GPU can combine to render content 611 on a display component 640. The rendered design interface can include web content from the browser 625, as well as design interface content and functional elements generated by scripts and other logic embedded with the web resource 605. By including scripts 615 that are directly executable on the GPU 612, the logic embedded with the web resource 605 can better execute the interactive system 100, including the plugin management system 200, as described with various examples.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
one or more processors; and
a memory to store a set of instructions;
wherein the one or more processors access the instructions from the memory to perform operations that include:
maintaining a data store that identifies a plurality of plugins;
receiving, via a text entry box within a search user interface, a first set of input provided by a user of a computing device;
matching the first set of input to a plugin in the data store;
determining, based on a set of configurations associated with the plugin, one or more prompts for a set of parametric values needed to execute the plugin;
displaying, within the text entry box, a visual representation of a given prompt that specifies at least one characteristic of a parametric value to be provided for the given prompt;
displaying, within the search user interface and for the given prompt, a set of selectable options that correspond to the at least one characteristic;
determining the set of parametric values based on a second set of input received from the user via the search user interface, wherein the second set of input includes at least a selection of one of the set of selectable options; and
triggering execution of the plugin using the set of parametric values in response to detecting a first trigger input provided by the user.

2. The network computer system of claim 1, wherein the first set of input, the second set of input, and the first trigger input are provided by a common input device of the user.

3. The network computer system of claim 1, wherein maintaining the data store includes associating each plugin with plugin execution logic that is specific to the plugin, and wherein the operations further include:
upon matching the first set of input to the plugin, executing the plugin execution logic associated with the plugin to display the one or more prompts to the user, the one or more prompts indicating a set of parameter terms associated with the set of parametric values; and
receiving the second set of input in response to displaying the one or more prompts.

4. The network computer system of claim 3, wherein the one or more prompts include alphanumeric output that identifies the set of parameter terms.

5. The network computer system of claim 1, wherein the one or more prompts are visually distinguishable from the first set of input within the text entry box.

6. The network computer system of claim 1, wherein the operations include:
recording historical information that includes the plugin and the set of parametric values; and displaying, within the search user interface based on the historical information, a preview that includes an indicator of the plugin.

7. The network computer system of claim 6, wherein the indicator includes at least a portion of the set of parametric values.

8. The network computer system of claim 6, wherein the operations include:
triggering execution of the plugin after displaying the preview.

9. The network computer system of claim 1, wherein the input characteristic indicates at least one of a format, a structure, or a type of input for the set of parametric values.

10. A method for providing plugins, the method being implemented by one or more processors and comprising:
maintaining a data store that identifies a plurality of plugins;
receiving, via a text entry box within a search user interface, a first set of input provided by a user of a computing device;
matching the first set of input to a plugin in the data store;
determining, based on a set of configurations associated with the plugin, one or more prompts for a set of parametric values needed to execute the plugin;
displaying, within the text entry box, a visual representation of a given prompt that specifies at least one characteristic of a parametric value to be provided for the given prompt set of parametric values;
displaying, within the search user interface and for the given prompt, a set of selectable options that correspond to the at least one characteristic;
determining the set of parametric values based on a second set of input received from the user via the search user interface, wherein the second set of input includes at least a selection of one of the set of selectable options; and
triggering execution of the plugin using the set of parametric values in response to detecting a first trigger input provided by the user.

11. The method of claim 10, wherein the first set of input, the second set of input, and the first trigger input are provided by a common input device of the user.

12. The method of claim 10, wherein maintaining the data store includes associating each plugin with plugin execution logic that is specific to the plugin, and further comprising:
upon matching the first set of input to the plugin, executing the plugin execution logic associated with the plugin to display the one or more prompts to the user, the one or more prompts indicating a set of parameter terms associated with the set of parametric values; and
receiving the second set of input in response to displaying the one or more prompts.

13. The method of claim 10, wherein the one or more prompts include alphanumeric output that indicates a type, a format, or a structure of a parametric value in the set of parametric values.

14. The method of claim 10, wherein the one or more prompts are displayed adjacent to an identifier for the plugin within the text entry box.

15. The method of claim 10, further comprising:
recording historical information that includes the plugin and the set of parametric values; and
displaying, within the search user interface based on the historical information, a preview that includes an indicator of the plugin.

16. The method of claim 15, wherein the indicator includes at least a portion of the set of parametric values.

17. The method of claim 16, further comprising:
triggering execution of the plugin after displaying the preview.

18. The method of claim 10, wherein the input characteristic indicates at least one of a format, a structure, or a type of input for the set of parametric values.

19. A non-transitory computer-readable medium that stores instructions, which when executed by one or more processors of a network computer system, cause the network computer system to perform operations that include:
maintaining a data store that identifies a plurality of plugins;
receiving, via a text entry box within a search user interface, a first set of input provided by a user of a computing device;
matching the first set of input to a plugin in the data store;
determining, based on a set of configurations associated with the plugin, one or more prompts for a set of parametric values needed to execute the plugin;
displaying, within the text entry box, a visual representation of a given prompt that specifies at least one characteristic of a parametric value to be provided for the given prompt;
displaying, within the search user interface and for the given prompt, a set of selectable options that correspond to the at least one characteristic;
determining the set of parametric values based on a second set of input received from the user via the search user interface, wherein the second set of input includes at least a selection of one of the set of selectable options; and
triggering execution of the plugin using the set of parametric values in response to detecting a first trigger input provided by the user.

20. The non-transitory computer-readable medium of claim 19, wherein maintaining the data store includes associating each plugin with plugin execution logic that is specific to the plugin, and wherein the operations further include:
upon matching the first set of input to the plugin, executing the plugin execution logic associated with the plugin to display the one or more prompts to the user, the one or more prompts indicating a set of parameter terms associated with the set of parametric values; and
receiving the second set of input in response to displaying the one or more prompts.

* * * * *

UNITED STATES PATENT AND TRADEMARK OFFICE
CERTIFICATE OF CORRECTION

| | | |
|---|---|---|
| PATENT NO. | : 12,411,697 B2 | Page 1 of 1 |
| APPLICATION NO. | : 17/888382 | |
| DATED | : September 9, 2025 | |
| INVENTOR(S) | : Bersabel Tadesse et al. | |

It is certified that error appears in the above-identified patent and that said Letters Patent is hereby corrected as shown below:

In the Claims

In Column 28, Line 32, in Claim 1, delete "prompt;" and insert -- prompt set of parametric values; --.

In Column 30, Line 33, in Claim 19, delete "prompt;" and insert -- prompt set of parametric values; --.

Signed and Sealed this
Fourth Day of November, 2025

John A. Squires
*Director of the United States Patent and Trademark Office*